United States Patent
Beckman

(10) Patent No.: US 9,032,335 B2
(45) Date of Patent: May 12, 2015

(54) USER INTERFACE TECHNIQUES REDUCING THE IMPACT OF MOVEMENTS

(76) Inventor: Christopher V. Beckman, San Diego, CA (US)

(*) Notice: Subject to any disclaimer, the term of this patent is extended or adjusted under 35 U.S.C. 154(b) by 139 days.

(21) Appl. No.: 13/585,831

(22) Filed: Aug. 14, 2012

(65) Prior Publication Data

US 2014/0053111 A1  Feb. 20, 2014

(51) Int. Cl.
*G06F 3/048* (2013.01)
*G06F 3/0481* (2013.01)

(52) U.S. Cl.
CPC .................................... *G06F 3/04812* (2013.01)

(58) Field of Classification Search
CPC ................................................. G06F 3/04812
USPC .................................................. 715/856, 858
See application file for complete search history.

(56) References Cited

U.S. PATENT DOCUMENTS

| | | | | |
|---|---|---|---|---|
| 5,905,497 A * | 5/1999 | Vaughan et al. | ............. | 345/672 |
| 6,049,326 A * | 4/2000 | Beyda et al. | ............. | 345/157 |
| 6,295,049 B1 * | 9/2001 | Minner | ............. | 715/856 |
| 6,760,049 B1 * | 7/2004 | Todd | ............. | 715/813 |
| 7,289,107 B1 * | 10/2007 | Straayer et al. | ............. | 345/161 |
| 7,853,900 B2 * | 12/2010 | Nguyen et al. | ............. | 715/861 |
| 7,904,835 B1 * | 3/2011 | Dhawan et al. | ............. | 715/858 |
| 8,214,763 B2 * | 7/2012 | Brunkhorst et al. | ............. | 715/817 |
| 8,248,365 B2 * | 8/2012 | Baudisch et al. | ............. | 345/157 |
| 8,294,669 B2 * | 10/2012 | Partridge et al. | ............. | 345/157 |
| 8,417,892 B1 * | 4/2013 | Roskind et al. | ............. | 711/133 |
| 8,502,787 B2 * | 8/2013 | Rigazio et al. | ............. | 345/173 |
| 8,555,207 B2 * | 10/2013 | Hildreth et al. | ............. | 715/863 |
| 8,627,226 B2 * | 1/2014 | Bates et al. | ............. | 715/785 |
| 2002/0051018 A1 * | 5/2002 | Yeh | ............. | 345/784 |
| 2002/0171688 A1 * | 11/2002 | Koncelik, Jr. | ............. | 345/856 |
| 2004/0165013 A1 * | 8/2004 | Nelson et al. | ............. | 345/858 |
| 2004/0205514 A1 * | 10/2004 | Sommerer et al. | ............. | 715/501.1 |
| 2005/0091612 A1 * | 4/2005 | Stabb et al. | ............. | 715/816 |
| 2005/0097557 A1 * | 5/2005 | Bradfield et al. | ............. | 718/102 |
| 2006/0031755 A1 * | 2/2006 | Kashi | ............. | 715/512 |
| 2006/0095867 A1 * | 5/2006 | Rogalski et al. | ............. | 715/858 |
| 2006/0274083 A1 * | 12/2006 | Makela | ............. | 345/619 |
| 2006/0288314 A1 * | 12/2006 | Robertson | ............. | 715/863 |
| 2007/0101263 A1 * | 5/2007 | Bedingfield | ............. | 715/526 |
| 2007/0186191 A1 * | 8/2007 | Kraemer et al. | ............. | 715/856 |
| 2007/0288870 A1 * | 12/2007 | Hunleth et al. | ............. | 715/858 |
| 2008/0022229 A1 * | 1/2008 | Bhumkar et al. | ............. | 715/838 |
| 2008/0092071 A1 * | 4/2008 | Chiu | ............. | 715/764 |

(Continued)

*Primary Examiner* — Jennifer To
*Assistant Examiner* — John Repsher, III
(74) *Attorney, Agent, or Firm* — Eric Adler

(57) ABSTRACT

New techniques improving display output and computer system input response are provided.
In aspects of the invention, a system assesses whether input gesture(s) occur within an area of an output matrix describing an element, within a time period following a substantial and/or activity-affecting change in that area, and nullifies or alters an affect(s) of the input gesture(s) that would otherwise occur, and may instead or also create the affect that would occur if the output matrix had not experienced the relevant substantial and/or activity-affecting change, and may also reverse, alter, augment or otherwise address the substantial and/or activity-affecting change in that area of the output matrix to enhance the user experience.
In other aspects, an object-based projection method increases efficiency and decreases output matrix judder.
In additional aspects, a new form of pixel and array, with variably-angled variably-curved pixel subsections, assists in further smoothing edges between objects.

11 Claims, 16 Drawing Sheets

(56) References Cited

U.S. PATENT DOCUMENTS

| | | | |
|---|---|---|---|
| 2008/0136785 A1* | 6/2008 | Baudisch et al. | 345/173 |
| 2008/0195472 A1* | 8/2008 | Shandelman et al. | 705/14 |
| 2008/0229254 A1* | 9/2008 | Warner | 715/856 |
| 2009/0113353 A1* | 4/2009 | Bansal et al. | 715/856 |
| 2009/0172560 A1* | 7/2009 | Cole et al. | 715/744 |
| 2010/0017757 A1* | 1/2010 | Basson et al. | 715/858 |
| 2010/0083098 A1* | 4/2010 | Leme et al. | 715/234 |
| 2011/0072399 A1* | 3/2011 | Kim et al. | 715/858 |
| 2011/0099040 A1* | 4/2011 | Felt et al. | 705/7.12 |
| 2011/0161866 A1* | 6/2011 | Rainisto | 715/785 |
| 2011/0197126 A1* | 8/2011 | Arastafar | 715/243 |
| 2011/0239300 A1* | 9/2011 | Klein et al. | 726/23 |
| 2011/0265040 A1* | 10/2011 | Shin et al. | 715/830 |
| 2011/0288913 A1* | 11/2011 | Waylonis et al. | 705/14.4 |
| 2012/0072821 A1* | 3/2012 | Bowling | 715/229 |
| 2012/0290974 A1* | 11/2012 | Doig et al. | 715/808 |
| 2013/0009915 A1* | 1/2013 | Hering | 345/178 |
| 2013/0047100 A1* | 2/2013 | Kroeger et al. | 715/760 |
| 2013/0104024 A1* | 4/2013 | Rajkumar et al. | 715/234 |
| 2013/0151944 A1* | 6/2013 | Lin | 715/234 |
| 2013/0205235 A1* | 8/2013 | Gabara | 715/763 |
| 2013/0227428 A1* | 8/2013 | Gustafsson et al. | 715/750 |
| 2013/0305193 A1* | 11/2013 | Kelley et al. | 715/858 |
| 2013/0332816 A1* | 12/2013 | Chakra et al. | 715/234 |
| 2014/0047394 A1* | 2/2014 | Kushler | 715/856 |

* cited by examiner

USER INTERFACE TECHNIQUES REDUCING THE IMPACT OF MOVEMENTS

FIELD OF THE INVENTION

The present invention relates to the field of computer system interfaces and, more specifically, to input and output hardware and management systems.

BACKGROUND

Computer input and output devices have been in use for several years. In what has been coined the "Mother of All Demos," Douglas Englebart of the Stanford Research Institute first demonstrated a mouse computer input device in conjunction with a computer display and also demonstrated dynamic file linking, in 1968. See Stanford University, The Demo, Clip 3 et seq., of the Stanford University Science & Technology in the Making website available on the World Wide Web at sloan.Stanford.edu (accessed May 31, 2012). By moving a mouse input device in a Cartesian plane and actuating input buttons, a cursor may correspondingly be positioned on a display matrix to actuate control features, such as file-summoning links ("hyperlinks"), appearing on the display.

More recently, additional control features, beyond hyperlinks, have been made actuable on displays, and displays have also expanded to include scrolling, hovering, 3D and RSS capabilities, all of which enlarge the universe of actuable features that may appear on an output display for control by a user with an input and/or output device. In certain instances, and especially in the context of the World Wide Web, displays may dynamically update actuable and other display elements based on input from external information and command sources.

In the context of displaying dynamic media subjects from a format with a time variable (such as a movie from a movie file), solutions have included refreshing pixels populating a 2-dimensional ("2-D") display, usually progressively, at a given "refresh rate," in hertz. In such systems, horizontal rows of pixels of the display are altered seriatim, top-to-bottom, in each refreshment, to match the state of the media for a given point in time being displayed. The media itself is also often recorded and output in terms of instances of time, such as a photographic shutter speed or "frame rate," which may or may not match the refresh rate of the display. Even in the most modern devices, the refresh rate and shutter speed can sometimes combine their spacings with one another unpredictably, causing apparent motion anomalies, such as flicker and judder. This may be true when refreshment and shutter speeds are non-factorial with respect to one another. Processing methods altering frames to achieve matched spacing of frames in the output refreshment (such as 3-2 pull-down) may reduce flicker but may increase judder by exaggerating the length of some frames, and may also cause other visual disturbances, such as interlaced, disagreeing frames. In addition, various processing times and routines of a computer and display system, and external media source, may widely vary the display rate of actuable features of a display. For example, LED or OLED technology, while currently extremely popular, with wide dynamic range and color capabilities and flat-panel proportions, may experience pixel and display uniformity issues, for example, because residual voltage from prior frames affects the output of pixels in new, refreshed frames or because pixels do not refresh gradually or smoothly enough, or because "motion smoothing" techniques introduce artifacts due to erroneous frame interpolation.

SUMMARY OF THE INVENTION

New techniques improving display output and computer system input response are provided.

In some aspects of the invention, a computer system with specialized hardware assesses whether an input gesture(s) (such as, but not limited to, a mouse click) occurs within an area of an output display defined by the system as describing a gesture-actuable element(s), object(s), or within a time period following a substantial and/or activity-affecting change affecting or potentially affecting it/them or that area of the display, which time may be user defined or system-defined, and may be based, in whole or in part, on actual or average user reaction and/or user action halting or reversal times. If the input gesture(s) occur(s) within such a time period, the system may nullify an affect (or affects) of the input gesture(s) that would otherwise occur in the computer system, and/or may instead create at least one affect that would have occurred if the output matrix had not experienced the relevant substantial and/or activity-affecting change in that area of the display, and the system may also reverse or otherwise address the substantial and/or activity-affecting change in that area of the output matrix to retain or otherwise enhance the user's use of actuable areas of an output matrix by co-locating gesture-describing aspects and actuable aspects of the display, among other improvements of the present invention.

In other aspects of the invention, output objects are defined by the system and/or an information storage and/or transmission format and medium based on defined boundaries, transitions or dynamic and non-dynamic regions or other properties of a projected image. The system may then use a new, modified progressive projection method to define and address first pixels or areas of the output matrix for (and/or to require) faster and more substantial modification over a time period (for example, in progressions or other patterns that emphasize or prioritize leading, trailing and otherwise dynamic or altering areas of those dynamic objects, such as moving edges, boundaries, or transitions), yet retaining output in other areas with or without the need to "refresh" them, or decreasing the priority of their refreshment, and thereby increase efficiency and decrease output matrix flicker effects and/or judder.

In additional aspects, a new form of pixel and pixel array, with variably-angled variably-curved pixel subsections, assists in further smoothing edges and displayed barriers, boundaries or transitions between objects.

Unless otherwise indicated, the following terms have the specific meaning described herein:

"Judder," in addition to its ordinary meaning and special meaning in the art(s) to which it relates, refers to a disruption in the display of recorded dynamic media, such as images, for a user viewing the display, in which at least some of the apparent motion or other rates and accelerations of objects do not match recorded or intended motion or other rates and accelerations, or they do not uniformly represent such rates when they are displayed, or the display otherwise creates a staggered, disrupted, artificially accelerated or decelerated, or jump-cut effect exceeding that of the recorded media and/or recorded subject of the media, or exhibits some other sensory anomaly, disturbance or uneven effect.

"Population Movement," in addition to its ordinary meaning and special meaning in the art(s) to which it relates, refers to the movement, repositioning, resizing and/or other change of displayed element(s), object(s) and/or other feature(s), or group(s) thereof, including but not limited to actuable object(s), on a display due to the increase or decrease (or process involving such increase or decrease) in number, size, display space occupation or position of at least one dynamic element(s), object(s) or other feature(s) in displayed sources, e.g., from media source file(s) being read and displayed, such as, but not limited to, an html page, embedded image files such as jpegs or a movie displayed on a display screen.

"Position Movement," in addition to its ordinary meaning and special meaning in the art(s) to which it relates, refers to the movement, repositioning, resizing and/or other change of displayed element(s), object(s) and/or other feature(s), or group(s) thereof, including but not limited to actuable object(s), on a display due to the change in position or to navigation action or to selection/hovering/actuation-related changes or to external reordering cue(s) (or process involving such change or cue(s)) of at least one element(s), object(s) or other feature(s) of displayed sources, e.g., from media source file(s) being read and displayed, such as, but not limited to, an html page, embedded image files such as jpegs or a movie displayed on a display screen.

"Zoom Movement," in addition to its ordinary meaning and special meaning in the art(s) to which it relates, refers to the movement, repositioning, resizing and/or other change of displayed element(s), object(s) and/or other feature(s), or group(s) thereof, including but not limited to actuable object(s), on a display due to the change in zoom or other apparent magnification (or process involving such change) of at least some part or aspect of the display (for example, enlargement or diminishment by zooming in or out of a 2-D display "window" in an operating system) of at least one element(s), object(s) or other feature(s) in displayed sources, e.g., from media source file(s) being read and displayed, such as, but not limited to, an html page, embedded image file(s) such as jpegs or a movie displayed on a display screen.

"Rotation Movement," in addition to its ordinary meaning and special meaning in the art(s) to which it relates, refers to the movement, repositioning, resizing and/or other change of displayed element(s), object(s) and/or other feature(s), or group(s) thereof, including but not limited to actuable object(s), on a display due to the change in rotation, pitch, tilt, yaw or gimbal of at least some part or aspect of the display (or due to a process involving such change) (for example, the rotation of the 2-D display of a smart-phone device by 90 or 180 degrees, from landscape to portrait, or vice versa, occurring when it's system's accelerometer indicates that a more upright display will result from such a rotation, and/or where a user then determines to fix the rotation in that position or rotate it further) or of at least one element(s), object(s) and/or other feature(s), or group(s) thereof in displayed sources, e.g., from media source file(s) being read and displayed, such as, but not limited to, an html page, embedded image files such as jpegs or a movie displayed on a display screen.

"Delayed Population," in addition to its ordinary meaning and special meaning in the art(s) to which it relates, refers to a condition of a display yet to present or deliver Called Elements or Objects or other Content, Called Positions of elements, Called Sizes (or Zoom-in and Zoom-out), positions or entire displayed pages or entire displays.

"Delayed Refresh or Population," in addition to its ordinary meaning and special meaning in the art(s) to which it relates, refers to any state of a display that has Called Element(s), Called Position(s) and/or Called Zoom(s) that have not yet been displayed, and the length of time meets or exceeds what is noticeable by a user or exceeds a length of time which a user or average group of users may be accustomed to or willing to withstand in terms of Called but Not Yet Displayed Element(s) without taking further action.

"Called Element(s)," "Summoned Element(s)," "Called Content," or "Summoned Content," in addition to its ordinary meaning and special meaning in the art(s) to which it relates, refers to object(s), element(s), content, boundaries, group(s), aspect(s), and/or other feature(s) (and/or sub-feature(s) of the same) capable of being displayed on a display (such as, but not limited to any or all of, text (including parts and effects thereof), images, objects, sound files, user interfaces, and parts, borders, boundaries, injected information or periodic aspects, and conditions or effects changing the appearance, activity and/or content of any of these) which may have begun to be displayed, requested, commanded, communicated or otherwise are existing in an at least partially executed procedure for display (e.g., due to a user gesture such as clicking on an interface aspect that may result in later displaying such an object, element, content, aspect or other feature), but which may have not yet been displayed or fully displayed. In the event that a Called Element or Summoned Element is not yet displayed or is not yet fully displayed, it may be referred to as a "Called" but "Not Yet (been) Displayed Element(s)" or a "Summoned but Not Yet (been) Displayed Element(s)."

"Called Positions," or "Summoned Positions," in addition to its ordinary meaning and special meaning in the art(s) to which it relates, refers to position(s) or positioning command(s), ranking(s), co-location(s) (with other element(s) or with respect to the display) or position movement(s) (including at least partially executed command(s) and process(es) related to later process(es) or movement(s)) for element(s), object(s), content, boundaries, group(s) and/or other feature(s) (and/or sub-feature(s) thereof), including, but not limited to, scroll position(s) such as horizontal, vertical and z-axis browser display scroll position(s) and repositioning cue(s) and rotation(s) and orientation(s) of display feature(s), which may have begun to be executed on a display or to be requested, commanded communicated or otherwise are existing in an at least partially executed procedure for display (e.g., due to a user gesture such as rolling a mouse scroll wheel or actuating a scroll interface aspect that may result in later positioning or repositioning such an object, element, content or aspect), but which may have/has not yet been displayed or fully displayed.

"Called Zoom," "Summoned Zoom," "Called Zoom-in," "Summoned Zoom-in," Called Zoom-out," or "Summoned Zoom-out," in addition to its ordinary meaning and special meaning in the art(s) to which it relates, refers to states of enlargement or diminishment, or other degrees of presented order or prominence (or at least partially executed command(s) and procedure(s) related to later enlargement or diminishment) of element(s), object(s), content, boundaries, group(s) and feature(s) of the same, and/or other displayed aspect(s), on a display, which may have begun to be displayed, requested, commanded or communicated but that may not yet be displayed or fully displayed.

"Pixel," in addition to its ordinary meaning and special meaning in the art(s) to which it relates, refers to a sampling and/or projecting non-human unit/device for displaying an image (including picture, sound or movie or other sensory media files of any format) which may or may not contain smaller sub-sampling and/or sub-projecting units, which may themselves be of a different shape, or multiple shapes, than the total pixel unit itself.

"Image," in addition to its ordinary meaning and special meaning in the art(s) to which it relates, means a visual or other representation (including but not limited to stored forms) or communication involving, at least in part, a tangible medium, where it is transmitted and/or recorded (and also refers to the recording itself), and does not necessarily, but may, include associated non-representational or partially representational elements aspects, or other features, such as metadata and internal and external relational or representational aspects (e.g., object identification properties and physics models for represented objects and other representational aspects). Images may be 2-, 3-dimensional ("2-D" or "3-D") or otherwise multidimensional and may refer to composites, series and organizations of images (e.g., slideshows and movie files) and related aspects (such as but not limited to non-visual phenomena, such as other electromagnetic radiation, sound waves, range-finding or 3-D model information from camera-supplementary range-finding sensors and relative position data from such sensors, olfactory, or tactile media). Thus, in addition to traditional visual images, an "image," as meant in this application, may refer, among other things, to representations, communications, transmissions and recordings that may or may not be rendered and/or depicted visually, such as a sound, smell, UV photograph or 3-dimensional tactile representation.

When used in this application, including but not limited to its claims, this and every other term defined in this application means each and every sense or alternate possible part of a sense within a definition separately, together and in any combination, as if so set forth in the text of the definitions.

DETAILED DESCRIPTION OF THE INVENTION

Figure 1:
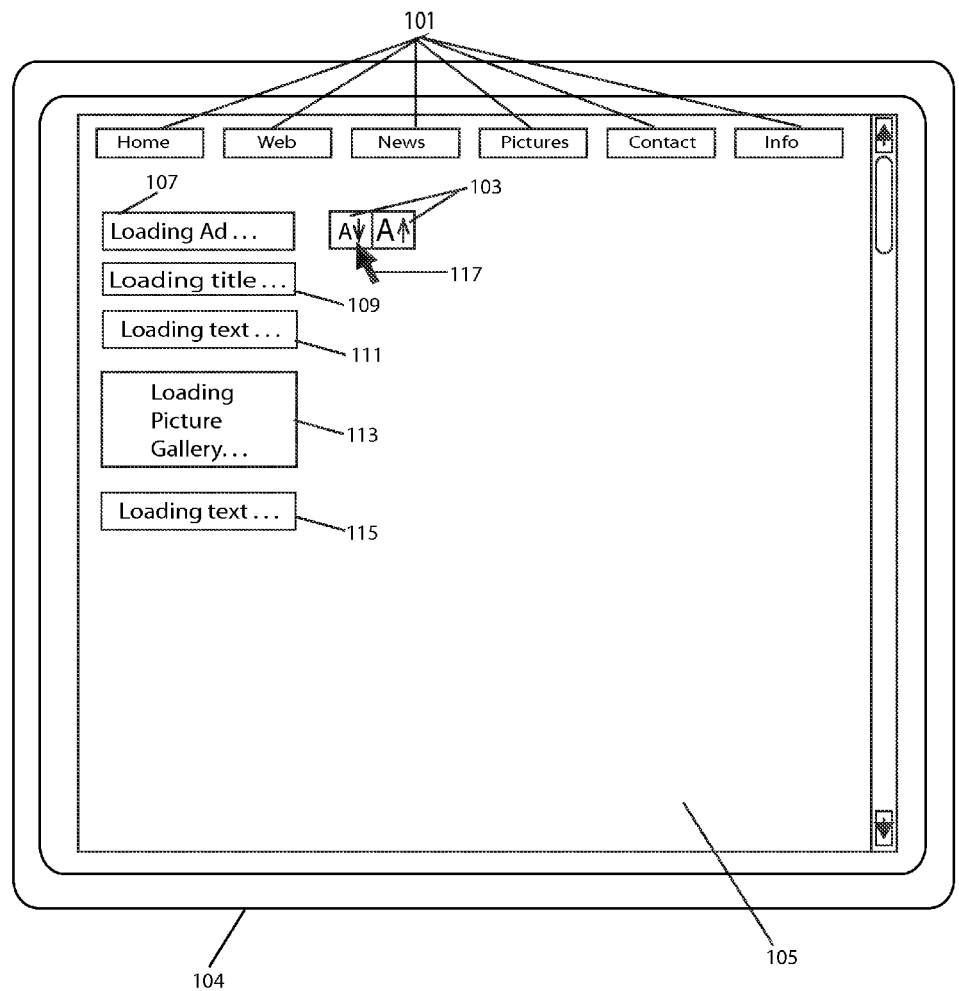
FIG. 1 is an exemplary depiction of an html file partially displayed by a browser window on a display of a system implementing aspects of the present invention, such as a computer system comprising hardware and software, while loading Called Content, and a gesture-enabling display element, namely, a cursor.

FIG. 1 is an exemplary depiction of an html file (a.k.a. "page" or "web page") partially displayed by a system, such as a computer system comprising hardware and/or software, and the system's output display in a browser window, while the system loads Called Content. FIG. 1 also includes a gesture-enabling display element, namely, an arrow-shaped cursor, 117. In more detail, menu button features 101 and text size adjustment features 103 have been displayed by the display 104 within browser window 105, but other features are not yet loaded and displayed by the system, such as, but not limited to, the exemplary control system shown as FIG. 9. For example, an advertisement is among Called Content being summoned for presentation by the system, as a Called Element, but has not yet appeared and/or fully populated at its position given in the html code, and, based on instructions from a program executed by the system, an advertisement location status placeholder 107 instead appears at or about that location or position and informs any user that an advertisement is currently loading, and will eventually appear in that position. For example, the upper-left corner of the status placeholder, or any other section(s), part(s) or coordinate(s), may be placed at the same location as a corresponding section(s), part(s) or coordinate(s) of the advertisement as it is to be placed on the display. Such corresponding section(s), part(s) and/or coordinate(s) for status placeholders may be matched or selected by the user and/or system.

In FIG. 1, status placeholders generated by the system, also including status placeholders 109, 111, 113 and 115, are shown as having a standardized status placeholder size and shape (e.g., standard width and/or height (e.g., rectangle) and/or Z axis (e.g., cube)). It is also possible, however, that the system would attempt to ascertain the eventual size of the space to be occupied by Called Elements (e.g., by a file format feature more initially and quickly communicating that space-holding information to the browser for creating placeholders of a corresponding size, before all Called Content is displayed or completely displayed and, also, as a separate option, showing or indicating progress of delivering the Called Content) and the system may create placeholders that occupy that same size in 2-D, 3-D or otherwise multidimensional space, or create padding around neighboring or otherwise spatially-impacted (if not for the padding) elements and content, to give users a more accurate sense of the final layout and/or reduce the impact of delivering a different layout when Called Content is later fully presented.

If some positional, rotational, size or other spatial shifting occurs or may be predicted to occur or potentially occur in a displayed file, around or in areas impacted by informational placeholders with standardized preview sizes (or around locations in html pages where Called Content will populate but placeholders are not given) which areas later populate with or are replaced by previously Called Content or Element(s) that are delivered and take up additional or differing space on the html page, the system may take further measures to improve display performance for a user. For example, if a user moves a movable display interface location/cursor 117, and/or begins to execute a gesture using interface location/cursor, 117, such as moving it over, near and/or about text size adjustment feature 103, (e.g., with the aim of clicking on the lower text size sub-feature/option of text size adjustment feature 103), the system may take initial measures and other action(s) to change the impact (including potential or realized impact), of such a location/cursor and/or gesture after determining or recognizing that the location/cursor and/or gesture may fail to impact feature 103 as likely intended or that the gesture may affect another actuable element that may be or become dynamic, due to potential repositioning by Population Movement.

More specifically, the system may treat the text adjustment feature 103 and the location/cursor 117 or a gesture therewith as each occupying an alternate, such as another 2-D or 3-D, display space or virtual space, and the system may or may not display that alternate space, with or without further visual indications or alerts that any of the measure(s) is/are occurring. Such an alternative space may or may not coexist with the previously existing display space, and at least some of the system measures may decay or be removed as the system action progresses and/or ends, and may or may not be in addition to retaining at least some of the features and capabilities of the previously existing display space of the browser window, in which further user gestures may be treated as occurring.

Alternatively, the location/cursor 117 and/or gesture(s) (or its action impact) may be treated by the system as being collocated or spatially fixed relative to the actuable element over, near and/or about which it is hovering/occurring—in this instance, buttons 103—as may be determined by greater or greatest proximity to, or greater or greatest gesture activity in pixels over, near and/or about that actuable element in comparison to other potentially actuable elements being displayed or in comparison to another, for example, fixed, distance and/or cursor activity value. The time prior to spatial shifting due dynamic elements in which the system determines such proximity to an actuable element may be user or system-set and variable and/or may be determined in part by system logic, which may incorporate or reflect statistical data concerning hand-eye and other user reaction times. The time for maintaining co-location of interface location/cursor 117 and/or a gesture(s) with such an actuable element may also be user or system-set and variable and/or may be determined in part by system logic, which may incorporate or reflect statistical data concerning hand-eye and other user reaction times, and such time may, and preferably will, extend past spatial moving of the actuable element impacted by spatial shifting from the delivery of Called Content for a set length of time set by the user, system or general user performance or performance optimization data. As another alternative, the system may, instead of assessing current location/cursor 117 and/or gesture locations near or about an actuable element, assess movement and project probable or possible locations at times that spatial shifting is possible or probable to occur. In either instance, by treating them as collocated or spatially fixed, the system may interpret location/cursor locations, movements and other user actuation gestures (or their impact) as occurring relative to the actuable element, at least for the time in which content is being loaded in any parts of the page that may ultimately alter the location, shape or otherwise impact characteristics of the actuable element.

As another option for addressing the display space impact of Called Content, the system may take multiple parallel actions for the cursor or other user-driven actuation interface which actions are display-time shifted, meaning that the system proceeds as if such actions were executed on the 2-D or 3-D display at some user-, system- and/or logic-set and/or variable time before the display changed to accommodate dynamic content in addition to another action taking place in the time or timeframe in which it is actually executed. As one example of how to accomplish this, the system may run parallel instances (some of which may be supplemented and/or discarded over time with further display-time shifted actions) of any program(s) impacting the display, and delay program executions in one instance to implement and/or restore the therefore time-shifted user-input actions. Alternatively, if possible, the system may reverse actions or execution steps within at least one instance of a program(s) to enable the alternate execution of user actions in the display-time shifted earlier timeframe. As another example, the system may slow or retard the execution(s) in at least one program instance(s), to have location/cursor placement and/or gestures exist or occur at such a user-, system and/or logic-set and/or variable earlier alternate time. Such earlier alternate times for parallel action may, for example, be such time periods after which it would be impossible or improbable for a user to have intended the gesture to occur with respect to content or elements impacted by Called Content, Called Zoom, or Called Positions because the new position impacted by such Called Content, Called Zoom, or Called Positions in the non display-time shifted display space has appeared for sufficient time to be assessed, or to likely be assessed, by the user. Where a method implementing multiple instances of a program is used, the system and/or user may, after a substantial spatial shift of an actuable element(s), such as an actuable element with proximity to location/cursor location 117, select and/or terminate instances for continued program implementation or discontinued implementation. As explained further elsewhere in this application, the system may also nullify actions that would otherwise occur for some time period after Population Movement and other movements of dynamic, actuable content.

It should be further emphasized, that, although FIG. 1 illustrates use of a conventional computer display, such as an RGB multiple-pixeled monitor, the present invention is not limited to this form of output hardware, and applies equally to any image-generating output device, including 2- or 3-D image generating devices.

Figure 2:
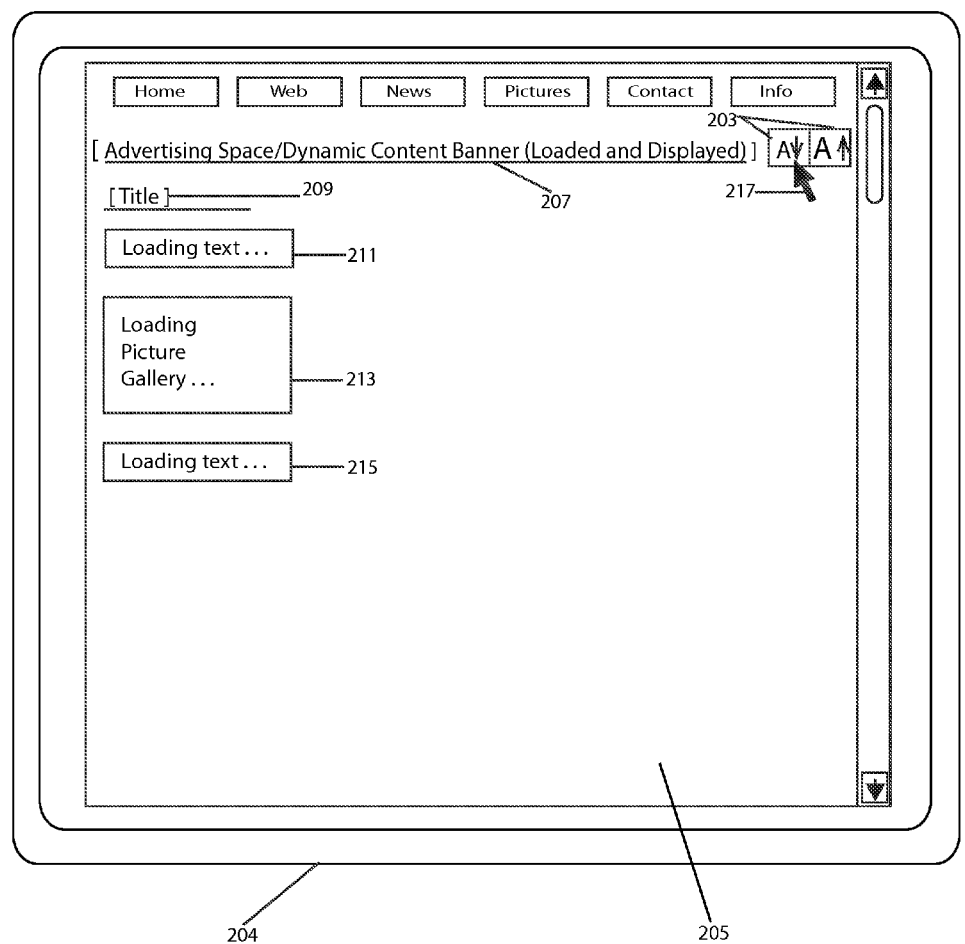
FIG. 2 is another exemplary depiction of the same html page file as depicted in FIG. 1, further, but not completely, loaded by the system, and in which additional populating content has repositioned actuable displayed elements, and aspects of the present invention related to those conditions.

To illustrate further, in FIG. 2, which depicts the same display of the same system as FIG. 1, but at a later time, location status placeholder 107 has been replaced by Called Content that it represented, namely, a loaded graphical advertisement 207, just as placeholder 107 warned the user. And, as a result, the additional space requirements of the loaded advertisement are greater than that previously taken by the placeholder 107 and at least the text size adjustment feature (now actuable element 203) has experienced a Population Movement spatial shift, because html code dictating its location pinned its position to the right-hand-side of element 207 (for example, with an html anchor or "float" command). If the population movement occurs suddenly and at an inconvenient time, the user may attempt and/or complete an actuation gesture during the time that Population Movement occurs, even though he or she may have begun the actuation gesture before Population Movement occurs. Rather than permit Population Movement to impact the effect of the gesture, measures such as those discussed above, with respect to FIG. 1, may permit the system to treat actuation gestures as occurring relative to the actuable element, in a defined, collocated space. For example, as shown by 203 and 217, that collocation treatment may be shown by the cursor 217 moving with the actuable element 203, now spatially shifted by Population Movement. But the system may, alternatively, show both locations of the cursor (main display space location prior to Population Movement and relocated position 217) or retain the cursor position prior to Population Movement, while nonetheless treating actions as occurring in an alternate space or location such as those discussed with reference to FIG. 1, at least for some length of time, as discussed above. Preferably, the length of time for an alternate space, or co-location action, or alternate or time-shifted program instance to be retained should be greater than the average human reaction time for visual stimulus, but may be greater or lower, and may be variably set by user or system setting(s) or preference(s), which may incorporate coefficients and statistical data related to user assessment and/or reaction times.

As mentioned above, rather than actuate gestures relative to a repositioned or re-defined space, or collocating interface location/cursors or gestures, the system may also, alternatively or in addition, deactivate at least certain effects of user gesture actuation, at least for a period of time (which may correspond with user reaction times or settings by the user or system) or until further cursor movement or other indications of purposeful interface direction over newly-loaded, -placed, -populated or -positioned elements, or content or features impacted thereby, have occurred. Further, the system may deactivate gesture activity with respect to newly-loaded, -placed, -populated or -positioned elements, content or features impacted thereby, or elements that are not the focus of demonstrated attention of the user (e.g., pop-up banners that arise and block or otherwise interfere with a form field being entered by the user) for at least a length of time, which length of time may be user or system variable, or above a majority or other statistical coefficient of human reaction time to visual stimulus, and the system may redirect or re-execute such user actions in previous content or demonstrated attention areas for the user. The system may also take further measures, explained in greater detail in further sections of this application.

Figure 3:
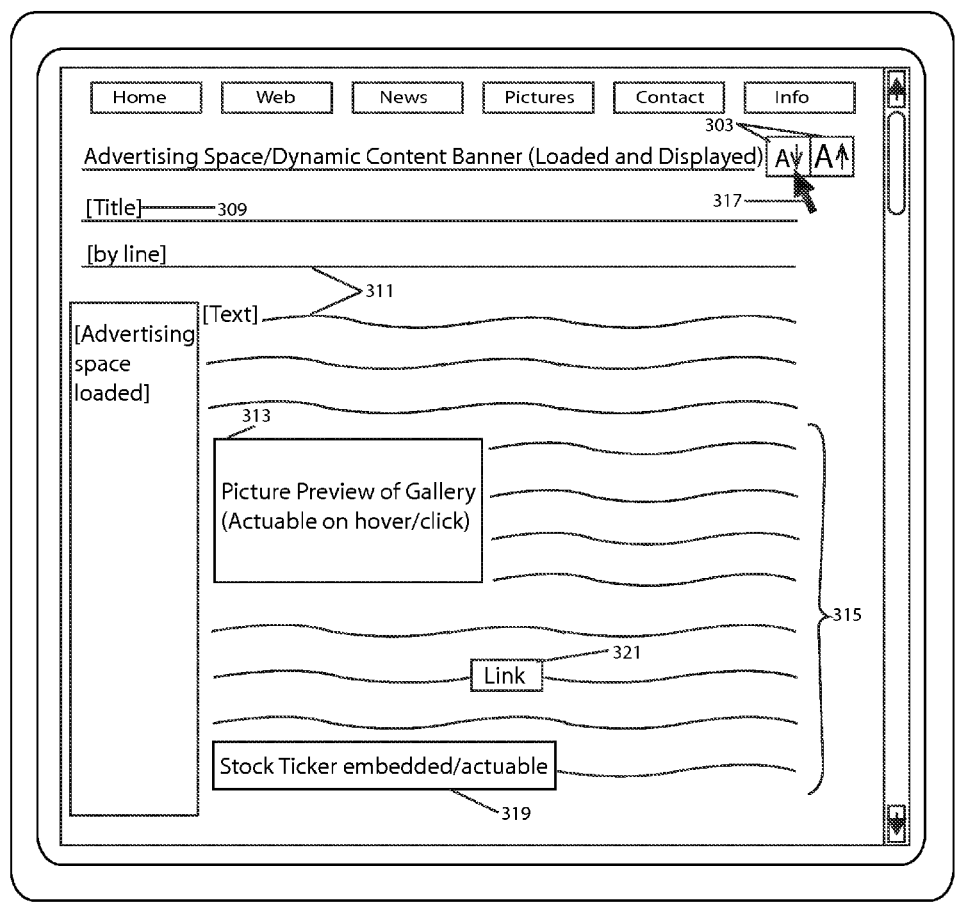
FIG. 3 is another exemplary depiction of the same html page file as depicted in FIGS. 1 and 2, further loaded by the system, and in which additional populating content has repositioned actuable displayed elements.

FIG. 3 is another exemplary depiction of the same html page file, further loaded by a system, and in which additional populated or displayed content has repositioned other actuable displayed elements or content. Several informational placeholders from FIGS. 1 and 2 have now been replaced by populating content, some of which is dynamic content linked to a potentially changing outside data source, such as embedded, actuable stock ticker element 319. FIG. 3 shows a display actuation location/cursor, now 317, in the same location as that shown in FIG. 2, in co-located space with text size adjustment feature (now actuable element 303). The additional populating content (after the display state shown in FIG. 2) may not have substantially affected the positioning of cursor 317, and the system may not take further action to redefine the impact of location/cursor 317 and future user gestures relative to 303 and other aspects of the display. However, if the cursor 317 were positioned above or near any actuable element that may have experienced population movement, or other spatial shifting or movement on the 2-D display of the browser window due to Called Content, Called Positions, Called Zoom or dynamic content (for example, in a blank area of the browser window of FIG. 2 that now contains actuable hyperlink 321) the system may take or have taken any of the actions discussed above, with respect to FIGS. 1 and 2 to control the impact of spatial shifting of actuable elements and interface aspects, such as a cursor. The treatment of the impacts of such Called Content, Called Positions, Called Zoom or dynamic content is illustrated further with respect to the following figures.

Figure 4:
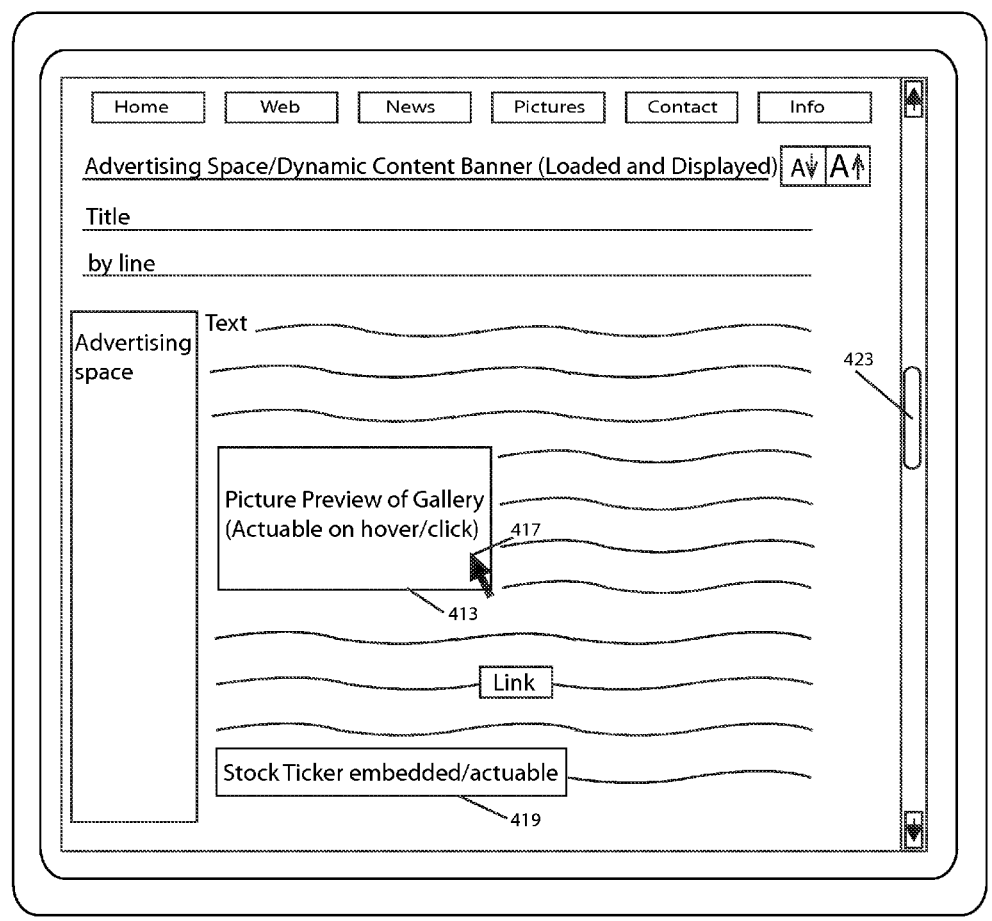
FIG. 4 is another exemplary depiction of the same html page file as depicted in FIGS. 1-3, and in which a Called Position (specifically, a called scroll position) has not yet been displayed by the system.

FIG. 4 is another exemplary depiction of the same html page file as displayed in FIG. 3, and in which a Called Position (specifically, a called scroll position) has not yet been displayed. More specifically, a user may have actuated a scroll control, such as the scroll wheel of a mouse or by moving the scrollbar handle 423 by user gestures, to indicate to the system and browser that the browser window should be scrolled downwards (meaning that elements further down from the bottom edge of the currently viewable page are commanded to be displayed, and the html page text and other elements are moved upwards). However, delay in executing any number of possible program tasks or in displaying Called Content necessary for the new scroll position at least temporarily results in substantially the same displayed html page content, rather than new and newly-positioned content required for the selected scroll position, in the instance shown in FIG. 4. Further, in FIG. 4, the cursor 417 has been repositioned by the user over a different actuable element 413 than in FIG. 3, namely, over an image preview for a picture gallery which, if clicked, would ordinarily result in the display of a new browser page dedicated to displaying a user-actuable picture gallery (not yet pictured). Of note, if the content for the selected scroll position were completely and fully populated, and the cursor position remained the same, the cursor would instead be positioned above the also actuable, dynamic stock ticker element 419, as further illustrated in FIG. 5.

Figure 5:
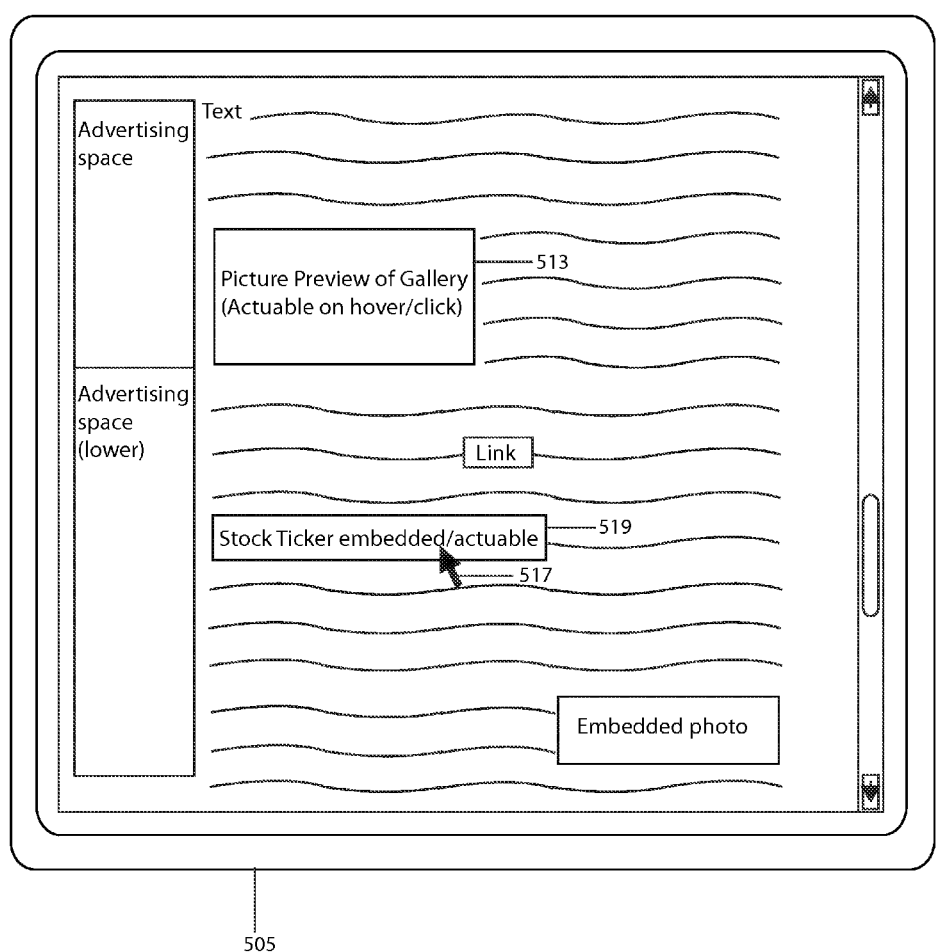
FIG. 5 is another exemplary depiction of the same html page file as depicted in FIGS. 1-4, further loaded by the system, and in which the called scroll position has been executed by the system and display, potentially impacting a gesture executed by a user.

FIG. 5 is another exemplary depiction of the same html page file, further loaded by a system, and in which the called scroll position has been more fully executed by the system and display. The cursor, now shown as 517, has not changed position on the 2-D display, or within the browser window, but content has been repositioned due to the Called Position of the scrollbar that has now been executed, in FIG. 5. In particular, the dynamic stock ticker element, 519, is now positioned underneath the cursor 517, and if the user were to inadvertently click or otherwise finish an actuation gesture intended for actuating the picture gallery preview element, shown as 413 and 513, at a point in time occurring after the scrolling Summoned Position causes population of elements in the new positions shown in FIG. 5, the system may prevent actuation of dynamic stock ticker element 519, and may also cause the actuation of the picture gallery instead, based on user settings or default settings for reaction time and functions thereof and according to other aspects of the invention disclosed in this application, such as forced collocation of the cursor and element about which it was situated at the time of element population. According to other aspects of the invention set forth in this application, the system may also or alternatively create an alternate and/or virtual space, which may or may not be also displayed, in which the cursor 517 and picture gallery preview element 513 remain in their previous position relative to one another, but the display may also present the cursor in its previous position above 513 even after the Summoned Position is present, and may highlight or otherwise call out that special action for the user while the effect is still being created by the system. Alternatively, or in addition, the cursor may be repositioned in an accelerated manner if the user moves the cursor off of the picture gallery, to restore its previous position within the window more rapidly than with ordinary mouse/cursor tracking, and the cursor may be made to accelerate toward new actuable elements as the user moves the cursor to a (user-variably) significant degree away from one actuable element and toward another. In spaces not near an actuable element, as defined by settings, the cursor movement may retain its ordinary movement tracking ratio. Other user interface options for addressing the potential ambiguity of which element the user may have intended are discussed below.

Figure 6:
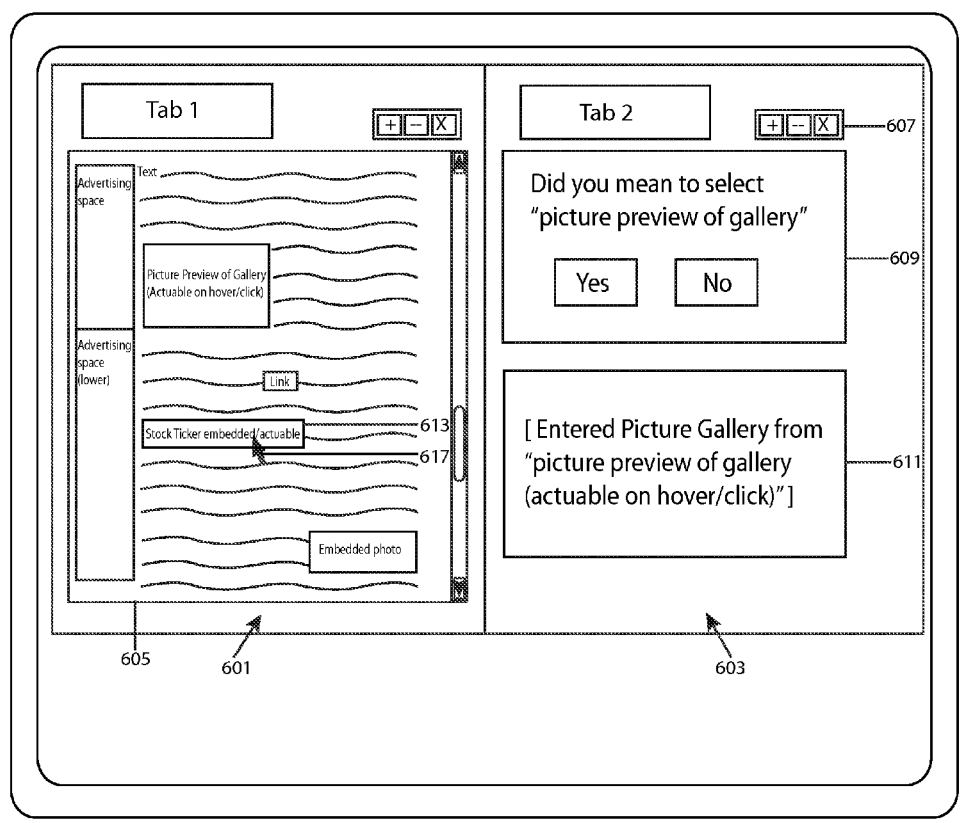
FIG. 6 is an exemplary depiction of aspects of a user interface used with hardware of the system in accordance with aspects of the present invention, which may address the impacted gesture of FIG. 5.

FIG. 6 is an exemplary depiction of aspects of a user interface used with a system in accordance with aspects of the present invention, which may impact the gesture of FIG. 5. In the event that the user completes an actuation gesture, as described in FIG. 5, which begins (such as hovering prior to click) in a position substantially the same as the position at which it completes on the display, but in a different position relative to actuable elements (within a time period setting, either by the user or system, and, preferably, above but not substantially above, or in some other function related to, average human or other user visual acquisition and reaction times) the system may take additional or alternative measures to those discussed in this application, by creating user interface options in which the user may specify which action was intended, or which further hardware actions the system should undertake, an example of which options are shown in this figure. In FIG. 6, a user interface presents two major options for resolving a user's intention ambiguity. Other situations giving rise to intention ambiguity, or potential or apparent ambiguity, such as cursor movement toward, rather than placement at, a location such as the location 617 maybe treated similarly. The user interface shown is divided into two major tabs, Tab 1, shown as 601, and Tab 2, shown as 603. In Tab 1 (601), previously shown browser window 505, now 605, is substantially shown, albeit in a now smaller section of the display in order to make room for additional elements on the display. By clicking in the space of Tab 1 (601), the user may call forth the previous prominence of that browser window, and other option selection elements, such as those in Tab 2 (603) may then minimize or exit the screen presentation. The same results may occur by the user's request for those results using some of interface controls 607. In sub-window 609 of Tab 2 (603), the user is presented with the option to enter the gallery (in effect, actuate the previously indicated actuable element 513). A preview sub-window 611, or other rapid acquisition facilitating feature, may aid the user in quickly understanding the result that may be selected. If the user selects "Yes," indicating that he or she in fact intended to enter the element (513) previously hovered over with the cursor, or near which the actuation gesture otherwise began, rather than where the gesture finished, the picture gallery may be selected and presented, just as if it were completely clicked in the first instance. In addition, Tab 1 (601) may automatically close, and may also be turned into a previous history page or bookmark tool for the browser, which is then presenting only Tab 2 (603). If, however, the user selects "No," the system would then restore the previous presentation of the window shown in FIG. 5, or, alternatively or in addition, execute the selection of a link embedded in the stock ticker symbol, as actually requested by the finished actuation gesture over that element, now shown as 613.

Any known user interface methods may be used to retain a preview or otherwise represent the options shown in FIG. 6. For example, a smaller, separate pop-up option item such as 609 might simply be presented above the browser window 605, which may otherwise be presented as in FIG. 5, occupying an entire browser window, rather than as a tab. A preview of the result of selecting another option 611 (selecting the picture gallery) also need not be displayed in some aspects of the invention, and in still other aspects of the invention, the options may only appear upon user settings or commands, such as keyboard commands or other optional gestures or selectable menu items.

The system may present additional user interface selection options enabling the user to select between multiple actions potentially intended ("intention ambiguity"). For example, in the context of the scenario set forth with respect to FIGS. 4-6, the system may instead present the user with a dialog window that states "Did you select . . . " and then present button options for selecting either, or both, of "picture preview of gallery" or "stock ticker link," for example.

Figure 7:
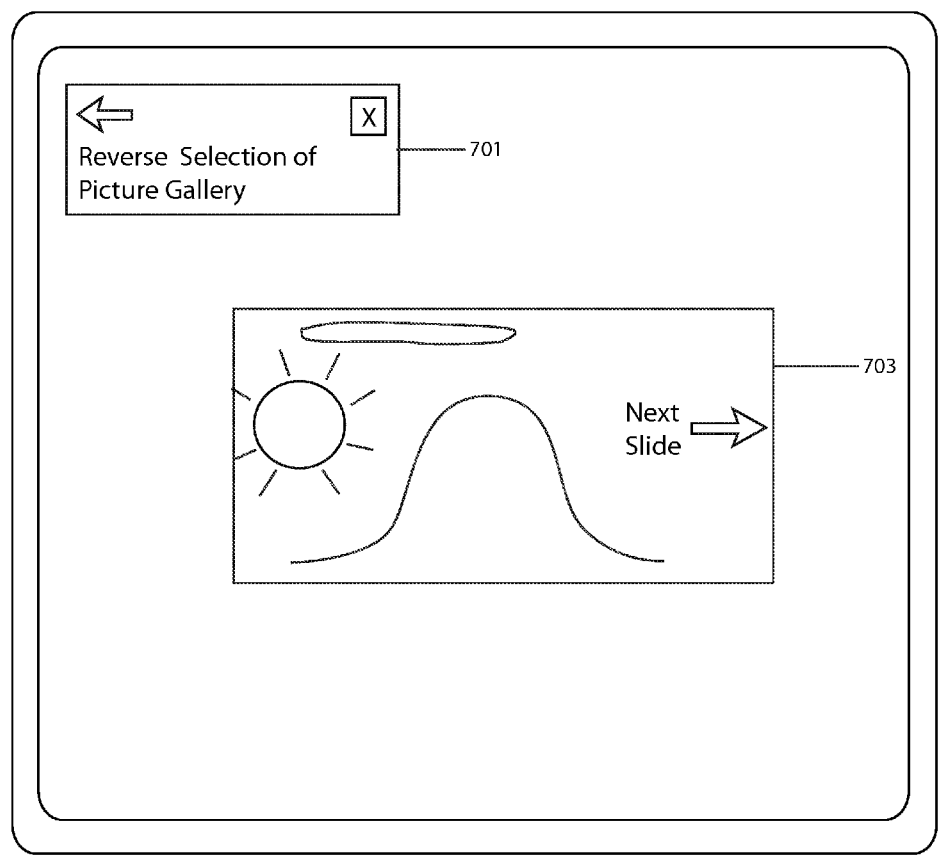
FIG. 7 is an exemplary depiction of further aspects of a user interface of the system in accordance with aspects of the present invention, which further addresses the impacted gesture of FIG. 5 and which also addresses further selections of a user.

If a user does select the intended but not previously executed (due to the scrolling Called Position being executed prior to actuation or full actuation) option—namely, entering the picture gallery—further options may be presented, such as those discussed with respect to FIG. 7. While a "back arrow" is often provided in browsers to return to previous browser actions, such back arrow tools reverse browser pages in a strictly-presented order, presenting the previously addressed or coded (e.g., URL address) page(s) according to their previous identifiers or source identifiers. In aspects of the present invention, reversing pages with a browser back arrow would be inconvenient, because the previous user interface option pages may be divided into tabs not in the page viewing history, may be encoded such that they cannot be refreshed, and otherwise are not what the user most likely seeks to execute by clicking on a back arrow. Instead, a user interface option 701 may appear in conjunction with (or upon hover over, or otherwise by user gestures, commands or behavior on or about) the entered picture gallery 703, which option 701 permits the user to directly restore a page or browser state that previously occurred, which may or may not be adequately represented or restorable in the browser history, namely, the browser previously presenting the html page, or, optionally, executing other possible intended actuation of actuable elements, or, optionally as well, presenting the previous selection screen discussed with respect to FIG. 6 in substantially the same state (and with the system in substantially the same state, or, as such except for memory, which may, for example, include further action history) as occurred at that time.

Generally, while presenting options for actions to be taken by a user, the system may execute any possible option—at the user's or system's direction with steps forward and backward in degrees that may be variably set by the user and/or system—and keep the activity of executing those options hidden, or more obscured, until the user actually seeks execution (or, more accurately, to see the execution which has already been carried out, but is not yet displayed) of those options. In this way, system delay in executing any navigation, actuation and execution possibility can be minimized. These pre-executed commands and navigation and execution options, and their program results, may be stored in any available memory, but preferably are in a memory location that is rapidly replaced or dropped and made available to be repurposed for additional navigation option pre-execution storage if the user's selection of options indicates that such stored results are no longer sufficiently likely to be selected, or within a number of steps necessary for preservation given the user's current navigation position.

Figure 8:
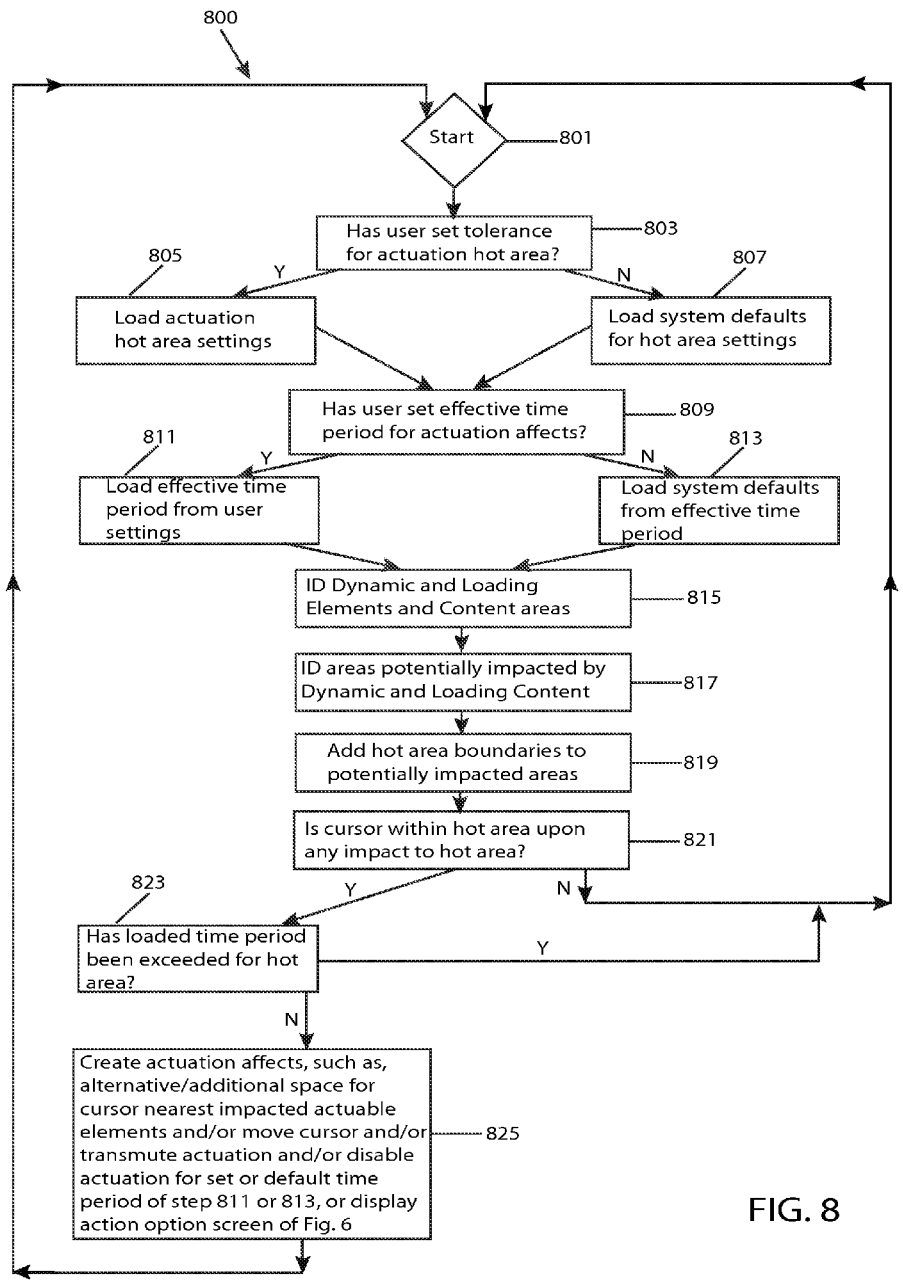
FIG. 8 is a process flow diagram for exemplary steps that may be taken by a system, such as a hardware and software system, implementing certain user interface and display aspects of the present invention.

FIG. 8 is a process flow diagram for exemplary steps 800 that may be taken by a system, such as a hardware and software system, implementing certain user interface and display aspects of the present invention. In step 801, the process begins and proceeds to step 803, in which the system determines whether a user has set a tolerance for an actuation "hot area." An actuation hot area means a region of display space, including and beyond an actuable element(s), object(s) or feature(s) on the display, that, if a cursor(s) or other actuation interface input/output control feature(s) (such as, but not limited to, point(s) or area(s) receiving input touch on a touch screen) is (or is projected to be at a referenced time) located within, and/or is executing a control gesture within or in relation to, may lead the system to take further measures discussed in this application to address Population Movement, Position Movement, Zoom Movement, Rotation Movement and generally Called Positions and Content, if any, that execute on the display and may impact actuation of such element(s), object(s) or feature(s) (i.e., create "actuation effects"). For example, and as discussed in greater detail elsewhere in this application, the system may take such measures as moving, co-locating, nullifying actuation of, or differently displaying or applying the effects of, an actuable element and/or cursor or other display interface control or location. Other examples of such further measures include, but are not limited to, further steps described in other areas of this application and with reference to this figure. Generally, actuation hot areas will include at least one displayed actuable element, object or feature, as well as a margin or "tolerance" area or space surrounding it, if room permits.

For example, in the context of a 2-D display, if a user creates a hot area setting including a margin or tolerance of "20 pixels" or "50%," the actuation hot areas of the display may be defined as the areas occupied by each actuable element, plus 20 pixels or 50% greater height and width, respectively, as a tolerance setting in all 4 (positive and negative y and x axis) directions from the edges of each actuable element. All principles in this application, including but not limited to these aspects, may be applied to 3 and more dimensional display(s), in which case features such as margin would include the Z or other such axes or dimensions, and margins could also be set in greater or lesser distances, amounts of time and in differing or gradually differing sensitivities (including temporal proximities and degrees of gesturing activity) depending on the type of actuable feature and areas within the actuable feature that may benefit from more or less actuation protection with sensitivity setting(s).

Alternatively, actuation hot areas may be set as a region of the display space including and beyond a cursor(s) or other actuation interface input/output control feature(s) such that, if an actuable element(s), object(s) or feature(s) is located within such a region, or is projected to be located within such a region at a referenced time, it may lead the system to take further measures discussed in this application to address Population Movement, Position Movement, Zoom Movement, Rotation Movement and generally Called Positions and Content, if any, that execute on the display and may impact actuation of such element(s), object(s) or feature(s).

In any event, if a user has selected such a hot area with user-directed settings, the system may proceed to load those settings in step 805, for reference and other use in subsequent steps. If, however, a user has not selected hot area settings, the system may load default hot area settings, in step 807. Either way, the system then proceeds to step 809, in which it determines whether the user has set a time period before, during, and/or following Population Movement, Position Movement, Rotation Movement and/or Zoom Movement and the execution of Called Positions or Content that may impact input gestures by moving or differently displaying an actuable element or other aspects of the display, during which time period the system will continue to address such movement, positions and/or content with steps as described in reference to this figure, and elsewhere in this application, for altering actuation affects. If so, the system loads for future reference and use such user settings for an actuation effect time period in step 811. For example, if a user sets an actuation effect time period of 1 second, Position Movement substantially impacting an actuation gesture that completes after such movement may be arrested in effect on any newly-appearing actuable element underneath the cursor, or may be connected in effect on the actuation element previously appearing under the cursor (immediately prior to Position Movement) for 1 second following that completed Position Movement. If, however, the user has not set such a time period, the system may proceed, in step 813, to load default settings for effective time periods of further steps taken in FIG. 8, including actuation effects, to have applied to impact a display. In either event, the system proceeds with the relevant saved settings, to step 815. In step 815, the system identifies dynamic elements or other loading elements and content, such as, but not limited to, Called Elements, Called Zoom, and/or Called Positions, that may result in Population Movement, Zoom Movement, Rotation Movement and/or Position Movement. If such elements and/or content are identified, the system may proceed, in step 817, to further identify user-displayed elements, content and other aspects that may be impacted by Population Movement, Zoom Movement, Rotation Movement and/or Position Movement. The system then proceeds, in step 819, to apply the hot area tolerances to create hot areas surrounding actuable elements and content, the actuation of which may be impacted by Population Movement, Zoom Movement, Rotation Movement and/or Position Movement. If, in subsequent step 821, the cursor or other display actuation aspect or location is determined to be located outside of any hot area upon the impact of Population Movement, Zoom Movement, Rotation Movement and/or Position Movement (and/or is projected to be so situated at a referenced time, such as at the time of such impact), the system returns to the starting position. If, however, the system determines that the cursor is, or is projected to be, located within such a hot area upon the impact of Population Movement, Zoom Movement and/or Position Movement, the system proceeds, in step 823, to further determine whether the Movement/Actuation treatment time period settings have been exceeded. If so, the system returns to the starting position. If not, however, the system proceeds, in step 825, to take further measures to address the impact of such Population Movement, Zoom Movement, Rotation Movement and/or Position Movement on actuable elements until an actuation gesture has been completed, the loaded time period has been exceeded, or the user has redirected new actuation activity to a new task following such impact. For example, as discussed above, the system may create a virtual space or other additional display space in which cursor or other user actuation feature locations are held relative to the actuable element creating the hot area, allowing completed actuation gestures to continue to impact the initially intended actuable element during the time period. As another example, the system may disable the effect of completed actuation gestures impacting new actuable elements and content arising under the cursor following Population Movement, Zoom Movement, Rotation Movement and/or Position Movement. As another example, again as described above, the system may create display-time shifted alternative actuations or actuation options. Following implementing such affects, if any are required, the system may return to the starting position.

The techniques eliminating and otherwise addressing the impact of Called Elements, Called Zoom and Called Positions, or system delay, specifically discussed herein are exemplary, and not exhaustive of the many specific forms that the present invention may take, while still carrying out aspects and objects of the present invention. By way of additional examples, where a user makes repeated similar actuation gestures that are ineffective due to the impact of Called Elements, Called Zoom or Called Positions that have not yet been fully displayed or made active or due to other system delay, the system may translate such repeated gestures into a more moderate number of instances, or degree of gesturing, and execute them in that fashion upon resumed display activity after the delay. Alternatively, the system may cancel the impact of such gestures altogether. In addition, if a display is rendered at least partly inactive by the impact of Called Elements, Called Zoom or Called Positions that have not yet been displayed, an indicator may appear to the user indicating the inactive state of the display space affected (e.g., an inactive browser in the display may have, for example, a shading block stating "processing" or "please wait", which may indicate progress). As another alert, the system may indicate to a user that the user may click into an actuable area to render a display aspect or element active, with another such indicator, and, by clicking in, the user may increase the system's resources for processing necessary to update or refresh that section of the display (e.g., program browser window) placing such processing into a higher execution position in a process or program execution order cue. The system may detect such activation gestures as gestures that involve the alert, or that serve no other actuation purpose for specific elements on the display, but which would otherwise occur within a defined actuable area of the display, if not for inactivation due to the impact of Called Elements, Called Zoom, Called Positions, or system delay. The system may also treat gestures that occur in substantially the same position or area on the display generally as before Called Elements, Called Zoom, Called Positions or system delay alter the position of actuable elements at and/or near that position, as errant and reduce or remove the impact that they would otherwise have until a user purposefully moves the actuation interface point(s) or areas (e.g., cursor, or finger position on a touch-actuable screen). If Called Elements, Called Zoom or Called Positions have taken more than a threshold amount of time (which measure may be variably set by the user or system) to be displayed, and/or if system delay occurs after such a threshold amount of time, the system may also inactivate any impacted Elements, Zoom, Positions, Rotations, etc., for an amount of time or until purposeful redirection of the cursor or interface point(s) or areas. The system may also redirect and/or restore the position, zoom, rotation and/or cursor location and any other state of the display that may have been impacted by Called Elements, Called Zoom, Called Positions and system delay, if the user's gestures indicate the desire to conduct activity with those elements or in those areas, positions, zoom and/or rotation states, and may attempt to also accommodate the Called Elements, Called Zoom, Called Positions in the display (for example, by making them visible and/or more prominent), optionally, if the user or system has selected such dual accommodation.

The system may attempt to restore any activation state of any elements, content, browsing history, position, user input, or other state of display navigation that may have been impacted by Called Elements, Called Zoom, Called Position or System Activity and Delay. In restoring user input, the system may further determine whether apparently input-accepting elements, which were in fact inactive at the time of at least some of the input, appeared on the display and at the locations where user input was attempted and, if so, the system may store a record of such attempted inputs which have failed or will fail to enter due to that inactivity and, if and when the input-accepting element(s) are made active, the system may re-execute the previously attempted input with respect to the now active element(s).

As mentioned above with respect to repeated input that has not necessarily failed, but is repeated due to the impact of Called Elements, Called Zoom, Called Positions, Called Content and system delay, assuming that multiple identical input has been attempted, the system may take several measures, as discussed above, to reduce, eliminate or translate such multiple gestures, among other things, into requests for processing priority.

In addition, although aspects of the invention have been described with reference to particular user interface and other elements, content, and features, it should be understood that a wide variety of alternative elements, content and features may be addressed in much the same way by implementing aspects of the present invention, to resolve intention ambiguity and otherwise address the impact of Called Content, Called Zoom, Called Position and other Called display aspects. For example, entire operating system windows or programs and their interfaces, and instances thereof, may be both Called Content and content impacted thereby, or content impacted by System Delay. In other words, if one such window, program interface, tab or other such program interface instance that has been Called But Not Yet Delivered may impact another displayed actuable element, the system may take any of the same measures discussed above to address user interaction, for example with cursor or gestures and other input, discussed above.

Figure 9:
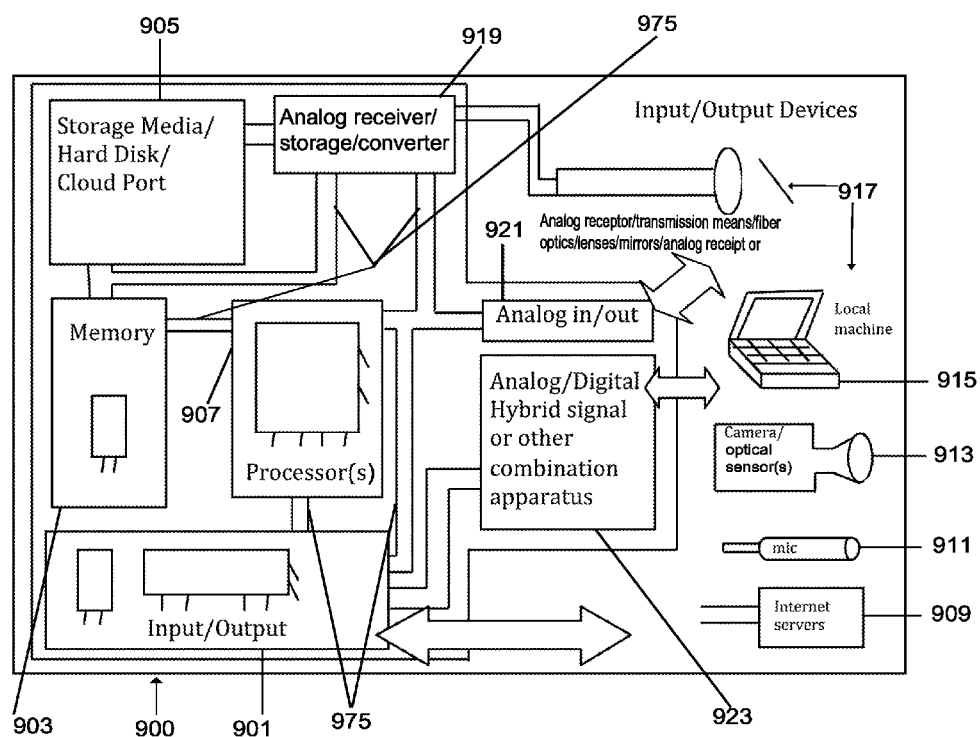
FIG. 9 is a schematic block diagram of some elements of a control system that may be used to implement various aspects of the present invention, other elements of which are depicted in FIGS. 1-8.

FIG. 9 is a schematic block diagram of some elements of a control system 900, preferably incorporating a machine-readable medium, that may be used to implement various aspects of the present invention, other elements of which are depicted in FIGS. 1-8 and 10-16. The generic and other components and aspects described herein are not exhaustive of the many different systems and variations, including a number of possible hardware aspects and machine-readable media that might be used, in accordance with the invention. Rather, the system 900 is described here to make clear how aspects may be implemented.

Among other components, the system 900 includes an input/output device 901, a memory device 903, storage media and/or hard disk recorder and/or cloud storage port or connection device 905, and a processor or processors 907. The processor(s) 907 is (are) capable of receiving, interpreting, processing and manipulating signals and executing instructions for further processing and for output, pre-output and/or storage in and outside of the system. The processor(s) 907 may be general or multipurpose, single- or multi-threaded, and may have a single core or several processor cores, including microprocessors. Among other things, the processor is capable of processing signals and instructions for the input/output device 901, analog receiver/storage/converter device 919, and/or analog in/out device 921, to cause a user interface to be provided or modified for use by a user on hardware, such as, but not limited to, physical human hand and other human body part interface controls (e.g., 3-D hand sensor, object emulator or joystick control) and/or a personal computer monitor or terminal monitor with a mouse and keyboard and presentation and input software (as in a GUI).

For example, a "window" presentation user interface aspect may present a user with selectable menu options in a GUI, to select settings for actuation hot areas and/or effective time periods during which actuation effects will occur following Position Movement, Rotation Movement, Zoom Movement and System Delay impacting displayed actuable elements, as described in greater detail elsewhere in this application. Another or the same window could present both actuable elements and aspects of a display and the visible results of such actuation effects managed and administered by the system.

As another example, such a "window" presentation user interface aspects may present a user with the option to target or gesture with respect to particular locations of visual emulations of a model or photographic subject, based on live feedback, such as imaging and the detected movement of painted or edge/boundary detected targets within a collateral medium or material. As another example, the user interface and hardware may allow a user to manipulate a virtual object that may translate movements into control input matching or related to those movements in real time, and with reference to a live model depicted on a computer monitor and presenting instantaneous information from an Nuclear Magnetic Resonance Imaging ("MRI") or X-ray radiographic (e.g., CAT scan) machine, which may allow a surgeon to apply physical force or ionizing energy to (or "lance") particular areas of a target, in particular shapes and sizes or pulses and pulse rates to substantially cut or ionize matter, which size and shape may be given a hardness of edge, tolerance, and strength, all individually controllable by a user, and which may be provided as feedback to the user by acceleration of the virtual object, either by an actuable effigy of the shape, size, position, resistance and weight of the virtual object and its controls, or by tactile stimulus (e.g., ultrasound and/or radiative feedback). A virtual object or other ionizing tool may include a shaped cursor which may be semi-transparent, and may allow the user to plan and view a portrayed path for the planned future ionization or other, for example actual, robotically actuated physical movement, such as surgical lancing or other subject manipulation, before it is actually implemented on a subject (which execution can be done in parts or degrees or completely, with a separate, later command to the system). As described in greater detail with respect to FIGS. 13 and 14 of this application, this manipulation path planning may be done with a cursor or other display, such as a computer monitor, or depiction/control hardware and techniques (e.g., 3-D physical contour and cutting or manipulation emulation device). In any event, a user may create a path of planned movement for lancing or other manipulation by programming such a path and/or by first executing the path in virtual or real space and, optionally, reviewing a depicted path based on that execution, and, if satisfied with the characteristics of the movement(s) of the executed path (e.g., direction(s), length(s), breadth(s), pressure(s), actual or real tissue reaction(s), location(s), size(s) of lancing or projected lancing, or blunt instrument trial or projection of where lancing or other actuation will take place), all of which characteristics may be displayed numerically or graphically as an attribute of a depicted path in a display as a "Planned Path," representation, the user may then choose to have the path executed on the patient/target tissues. Optionally, before choosing to execute the path, the user may choose to save a file composed and capable of executing the characteristics of the movement on the system. Also optionally, the user may elect to modify individual, several or all characteristics of the path over any part of the path's progression (for example, by creating or manipulating segmentation tools such as anchor points along the path), again may choose to save such a file comprised of such information, and again may choose separately to execute the path, which may be executed at different speeds along the path or even with a graduated and/or matched acceleration device, such as a throttle for the path's execution speed (using any possible units/time) which may be stopped at any time during observation of the movement. The system may automatically, or at the user's direction, adjust the path or path segments for unintended hand tremor by smoothing or substituting more graduated curves and movement accelerations along progressions or as to characteristics of the path. The system may automatically, or a user may direct it, to generate reactive or protective radiation in greater, lesser or other amounts that better interfere and protect against ionizing radiation, for protected collateral areas, as well, as another example, based on live feedback concerning the amount of protection actually occurring through interference, as sensed by the system, and/or based on physical models, including refraction models.

The processor(s) 907 is/are capable of processing instructions stored in memory devices 905 and/or 903 (or ROM or RAM), and may communicate via system buses 975. Input/output device 901 is capable of input/output operations for the system, and may include and communicate through numerous input and/or output hardware, and numerous instances thereof, such as, but not limited to, a computer mouse, touch screen, flat panel display, and pixel arrays, including a pixel array with differently addressable and separately (or in any progressive or other sub-group) scannable and projectable pixels, or contoured and rotatable, tiltable and shiftable pixel sub-elements, as described in FIG. 12, MRI machine, X-Ray radiography device, robotic surgical actuator(s), magnetic field creators or modifiers/oscillators (and magnetically-actuated, locatable particles, such as nano-particles, or manipulation devices that are systemically or locally available in patients, e.g., nano-particles with abrasive surfaces that may spin, expand, grab, cauterize through electric charge, in an oscillating magnetic field and that may also react to markers on targets, available through injection into the patient), communications antenna, electromagnetic radiation source(s), keyboard, networked or connected second computer, camera or scanner, a multi-tiered information storage device (including its actuators and read/write apparati), mixing board, real-to-real tape recorder, external hard disk recorder, additional movie and/or sound editing system or gear, speakers, external filter, amp, preamp, equalizer, computer display screen or touch screen. It is understood that the output of the system may be in any perceptible form. Any such display device or unit and other input/output devices could implement a program or user interface created by machine-readable means, such as software, permitting the system and user to carry out the user settings and input discussed in this application. 901, 903, 905, 907, 919, 921 and 923 are connected and also able to communicate communications, transmissions and instructions via system bus(ses) 975. Storage media and/or hard disk recorder and/or cloud storage port or connection device 905 is capable of providing mass storage for the system, and may be or may include a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive. Generally speaking, the system may be implemented as a client/server arrangement, where features of the invention are performed on a remote server, networked to the client and made a client and server by software on both the client computer and server computer.

Input and output devices may deliver input and receive output by any known means, including, but not limited to, the examples shown with respect to examples 917. The input managed and distributed by the system may be any representational aspect or signal or direct impression captured from any sensed or modeled activity, and may be taken or converted as input through any sensor or carrier means known in the art. In addition, directly carried elements (for example a light stream taken by fiber optics from a view of a scene) may be directly managed, manipulated and distributed in whole or in part to enhance output, and whole ambient light information may be taken by a series of sensors dedicated to angles of detection, or an omnidirectional sensor or series of sensors which record direction as well as the presence of photons sensed and/or recorded, and may exclude the need for lenses (or ignore or re-purpose sensors "out of focal plane" for detecting bokeh information or enhancing resolution as focal lengths and apertures are selected), only later to be analyzed and rendered into focal planes or fields of a user's choice through the system. For example, a series of metallic sensor plates that resonate with or otherwise detect photons propagating in particular directions would also be capable of being recorded with directional information, in addition to other, more ordinary light data recorded by sensors. While this example is illustrative, it is to be understood that any form of electromagnetism, compression wave or other sensed phenomenon may include such sensory, directional and 3D locational information, which may also be made possible by multiple locations and/or angles of sensing, preferably, in a similar or measurably related, if not identical, time frame. The system may condition, select all or part of, alter and/or generate composites from all or part of such direct or analog image transmissions, and may combine them with other forms of image data, such as digital image files, if such direct or data encoded sources are used. Specialized sensors for detecting the presence of interference or resonance of radiation of any type, and imaging the sources or capturing the forces applied based on the known characteristics of waves and electromagnetic radiation in particular, may also be included for input/output devices.

While the illustrated system example 900 may be helpful to understand the implementation of aspects of the invention, it is to be understood that any form of computer system may be used—for example, a simpler computer system containing a processor for executing instructions and a memory or transmission source. The aspects or features set forth may be implemented with, and in any combination of, digital electronic circuitry, hardware, software, firmware, or in analog or direct (such as light-based or analog electronic or magnetic or direct transmission, without translation and the attendant degradation, of the image medium) circuitry or associational storage and transmission, as occurs in an organic brain of a living animal, any of which may be aided with external detail or aspect enhancing media from external hardware and software, optionally, by networked connection, such as by LAN, WAN or the many connections forming the internet. The system can be embodied in a tangibly-stored computer program, as by a machine-readable medium and propagated signal, for execution by a programmable processor. The method steps of the embodiments of the present invention may be performed by such a programmable processor, executing a program of instructions, operating on input and output, and generating output. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 10:
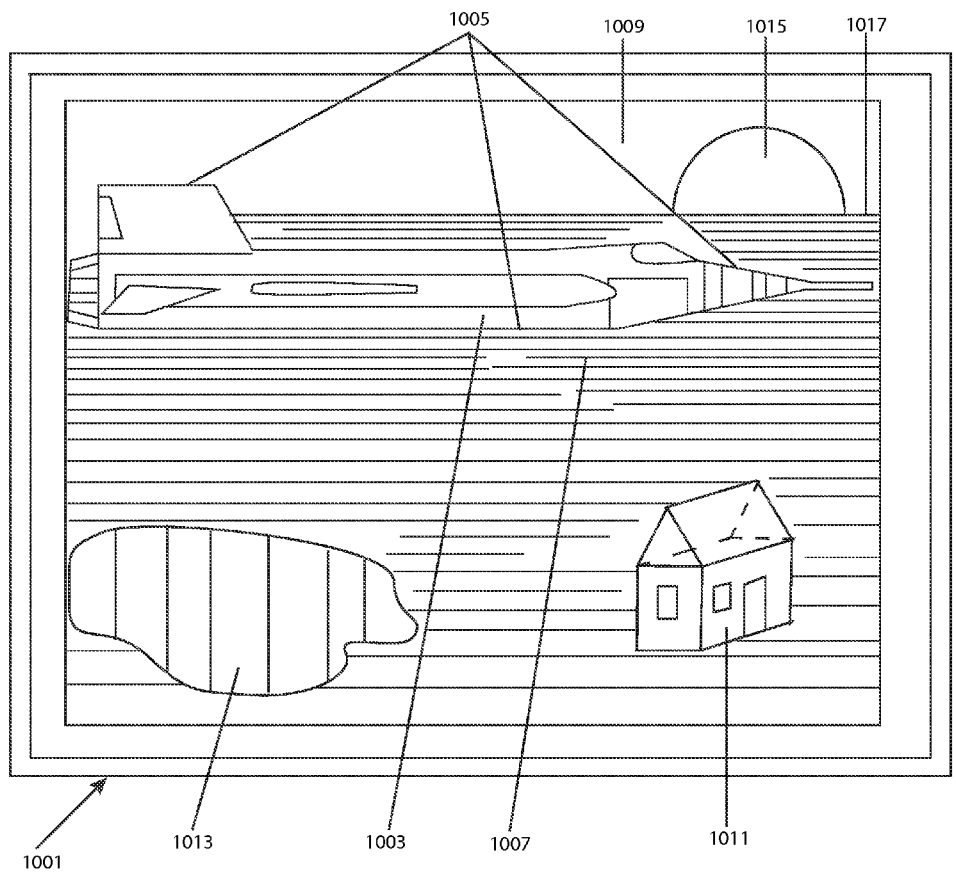
FIG. 10 is a depiction of a single frame of a video file presented on a display of a system, such as a computer system with hardware and software, which will serve as the platform for discussion of further aspects of the present invention.

FIG. 10 is a depiction of a video display 1001 of single frame image of a multiple frame video file, as it might be displayed on a system, such as a system comprising computer hardware and/or software and/or a network, and which will serve as the platform for discussion of further aspects of the present invention. The system may identify moving and fixed objects within the image, for example, based on edge or other object transition detection, identification across multiple frames and the movement of those edges and/or transitions from one frame to another. For example, the body of an airplane may be identified as a moving object 1003, and may be so detected as an object based on its edges, such as edges 1005, and/or other edges, transitions or other differentials with background elements and based on shape comparisons, and because previous and subsequent frames show a substantially similar, even if perspective-shifted, object in a new position relative to background elements. Such background elements include land 1007, a sky 1009, a farmhouse 1011, a lake 1013 and the sun 1015 setting into a horizon 1017 and, for the purposes of the example of aspects of the present invention disclosed with reference to FIG. 10, are assumed to be in substantially fixed positions within the display 1001 due, for example, to a fixed (rather than panning) camera source of the video media being displayed, and due to the stationary nature of the objects giving rise to the identification of those background elements. If, for example, the video frames subsequent to that shown in FIG. 10 yield recognition of a substantially identical object (the airplane, 1003) but shifted further to the right-hand side of the display, and/or previous frames yield recognition of a substantially identical object but shifted further to the left-hand side of the display, the system may identify an object (an airplane) moving from the left-hand-side to the right-hand side of the display. The treatment of display elements, such as pixels, given such object recognition, which may be by a variety of alternative means, including object libraries matched with general shapes of movable objects and their likely or possible edges, is discussed with reference to FIG. 11.

Figure 11:
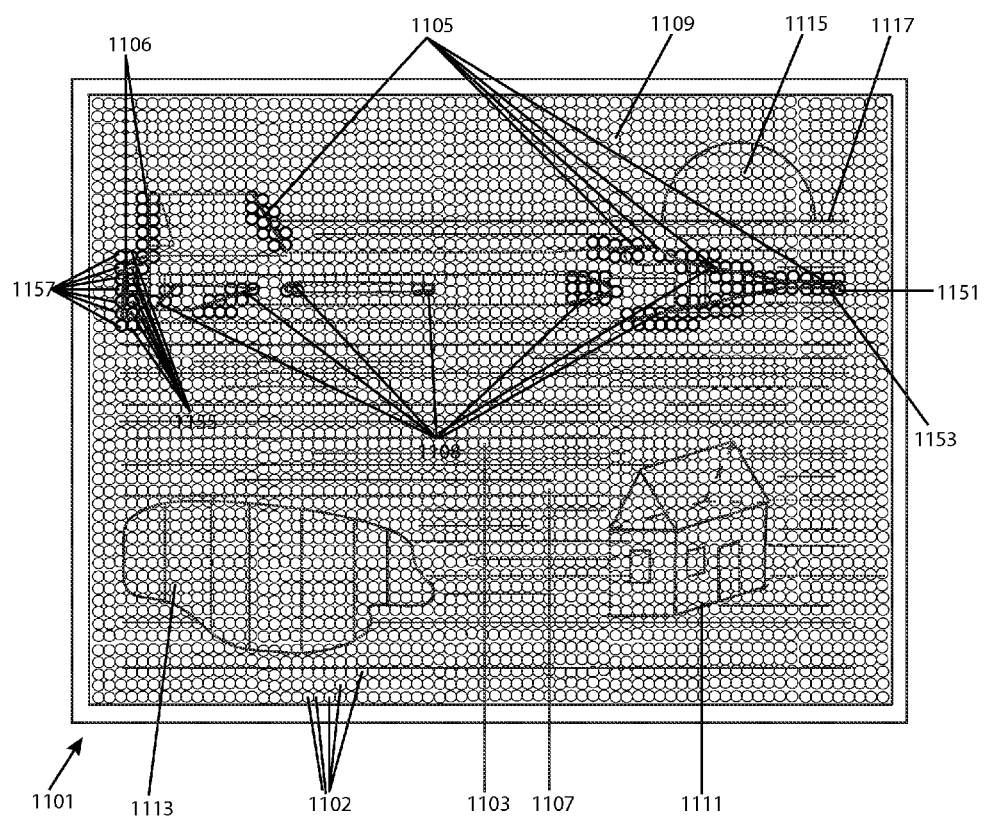
FIG. 11 is a depiction of the order of pixel scanning and/or refreshment of the display of FIG. 10 by the system, provided that object recognition and motion analysis is as discussed reference FIG. 10.

FIG. 11 is a depiction of an exemplary order of pixel scanning and/or refreshing within a display to generate the image of FIG. 10, provided that object recognition and motion analysis is at least in part by techniques discussed in reference to FIG. 10. In FIG. 11, the same display from FIG. 10 is shown, as 1101. However, an exemplary array of pixels in an at least partially uniform, space-filling pattern or tessellation for creating and projecting the image for a viewer, is shown, filling the display space. Examples of these pixels in a region at the bottom, center of the display are shown as 1102. Rather than scanning and/or refreshing pixels left-to-right in rows, progressing from top to bottom, as is done in, for example, 1080p or 1080i high-definition television and other display technology, the display-filling array of pixels including 1102 is scanned by a display system either non-progressively or progressively with priority given to leading and trailing edges of identified moving objects. Leading and trailing edges may be identified and defined by an associated computer system and hardware as those edges of and between identified moving objects on the display, or of and between identified moving and fixed objects, that result in a substantial required transition in pixel output to display the image currently in the process of being displayed in comparison to a previous frame. For example, in the instance shown in FIG. 11, some leading and trailing edges are shown by darkened lines 1105, 1106 and 1108. According to aspects of the present invention, pixels which trailing and leading edges have moved into (and begun to be displayed by) in the current frame, and pixels from which the leading or trailing edges of moving objects have moved in comparison to the previously displayed frame (displayed by in the previous frame), may be given a higher priority for progressive scanning (meaning that the system will scan and or refresh them sooner than other pixels), and scanning may begin at the first leading edge (closest to the direction of movement). In the instance of FIG. 11, therefore, the first refreshed pixel by the progression might be pixel 1151, followed by pixel 1153. Based on the assessed speed of the object, a greater number than 2 pixels, and/or pixels that do not abut one another, may instead be required to be refreshed in higher priority to represent the moved edges and show the most accurate timing of object movement. Similarly, simultaneous refreshment of all pixels affected by trailing and leading edges may be preferred. But in the instance of FIG. 11, it is assumed that the current and previous frame are timed such that sets of two or three neighboring pixels (as shown by darkened pixels in the figure) are affected, and are differently affected, by a leading and trailing edge in the current and previous frame. It is also possible to begin or assign priority to the type of progressive refreshment discussed with reference to FIG. 11 in an order of leading edge, from right-to-left or left-to-right. In other words, pixels 1155 may be refreshed first, to show the change in depiction of trailing edges 1106, followed by refreshing pixels 1157, or vice versa, and then proceeding to refreshing the next trailing or leading edge's pixels to the right. This approach leads to a slight compression effect, whereas the previously discussed approach (refreshing pixel sets from the direction of motion of the object and proceeding toward the trailing end) leads to a slight extension effect, on moving objects. In either event, following such leading and trailing edge refreshment, the system and display may then proceed to refresh other pixels, corresponding with more static objects, in another progressive order (which may also prioritize leading and trailing edges of objects that move, albeit more slightly then objects generating higher priority, if any, or may alternatively proceed in a standard progression which may skip the already refreshed pixels depicting trailing and leading edges).

Preferably, the type of pixel array and backlighting, if any, used in the display are of a kind with an output that does not need to substantially change if not refreshed by a progressive scan, resetting and/or refreshment stage. If, however, the type of pixel chosen requires periodic resetting and refreshment to maintain output, preferably, such refreshments are independent from and timed (including occurrence, duration and spacing) such that they do not coincide or otherwise interfere with refreshment according to the aspects of the invention discussed with respect to this figure.

Also preferably, the pixels each contain sections with a plurality of differently-angled edges (some of which are more curved, and some of which are more straight), each of which may be separately activated to create lines that better approximate the edges of depicted objects. A file format, including a data section encoding for pixel refreshment order and best edge approximation activation and/or actuation of each pixel part, and/or groups of pixels and pixel parts with those activation and/or actuation settings, may be used as an alternative to object recognition coupled with settings for refreshment order and for best approximating identified lines carried out locally by the displaying computer system. An exemplary sectioned pixel of this type is discussed in relation to FIG. 12.

Figure 12:
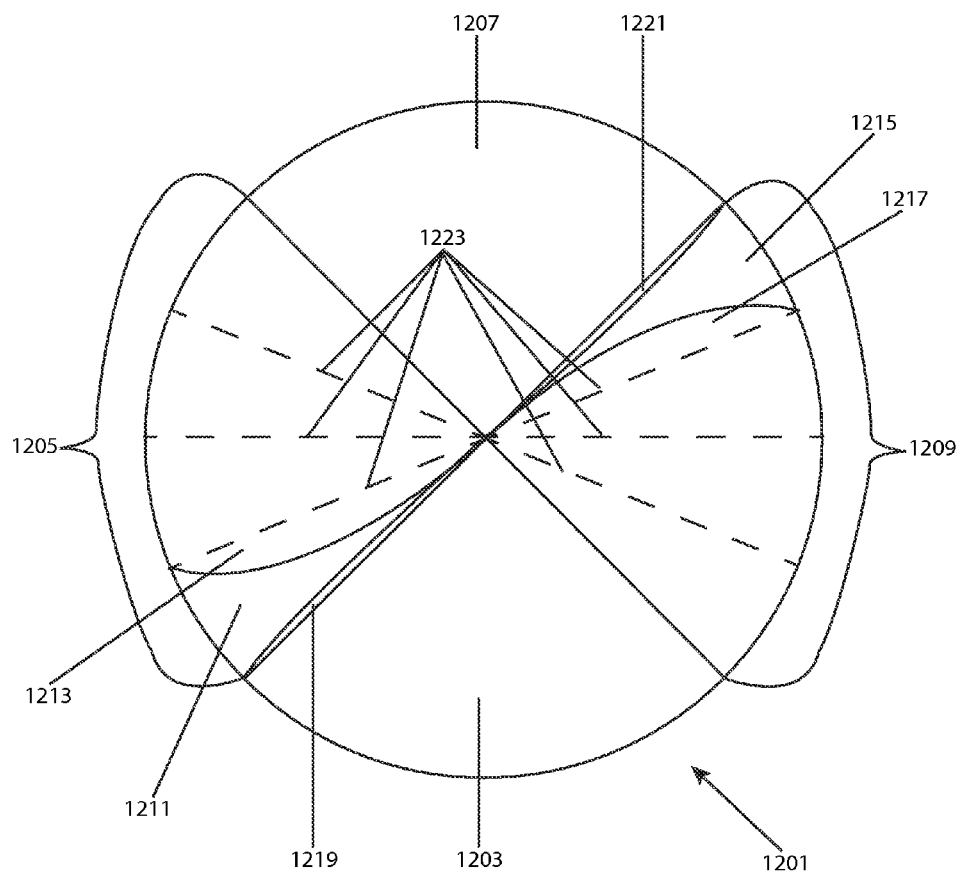
FIG. 12 is an exemplary illustration of parts of a new form of pixel, which may better present lines, curves and transitions of displayed media, especially, such lines, curves and transitions that are not perfectly vertical or horizontal, in accordance with aspects of the present invention.

FIG. 12 is an exemplary illustration of parts of a new form of pixel 1201, which, in an array, may better approximate lines, curves and transitions of displayed media that are not perfectly vertical or horizontal or otherwise matched to lines of a pixel array. The exemplary sectional pixel shown contains four major sections, which are shown, clockwise from the bottom, as 1203, 1205, 1207 and 1209. These major sections 1203-09 are discrete light-emitting areas, which may be used individually to emit different light, colors and shades, and may be individually activated to emit such light, colors and shades turned on and turned off. The boundaries of the major sections 1203-09 are shown as substantially straight radial or diametric lines, and at angles opposing or substantially different from vertical and horizontal axes of a display in which it might be embedded, such as the display shown in FIG. 11, and preferably, at a 45 degree or otherwise evenly offset angle from pixel separation lines. Also depicted in FIG. 12 are curvilinear boundaries between pixel sub-sections 1211, 1213, 1215 and 1217 as well as sub-sections 1219 and 1221. As with the major sections, curvilinear subsections 1211-21 may be discrete light-emitting areas, which may be used individually to emit different colors and shades, and may be individually activated, turned on and turned off, according to both object and object motion characterization by the display system, or by a file format system dictating their activation and emission to best approximate the needs of displayed media. The barriers between pixel sections and sub-sections may aid in creating internal reflection—for example, with mirrored surfaces—or may be light-absorptive, to increase definition between such sections and sub-sections. Alternatively, light migration between pixel sections and sub-sections may be permitted and/or softened by graduated opaque material within the sections and sub-sections that increases towards the barrier edges. In this way, the effect of barriers, gaps and edges between pixels, pixel sections and sub-sections, and other display elements, may be muted by matching, gradual light diffusion, rather than harsh barriers or gaps in the generated image by the display with barriers between elements and/or subelements. Curvilinear subsections such as 1211-21 may be used as a subdivision to any major section of the pixel, and in any $16^{th}$ of the pixel, some of which $16^{th}$s are analytically shown, for example by dashed lines 1223, or may be used in place of the major sections, in which case, sub-sections 1219 and 1221 are omitted (or, more precisely, combined with the sections counter-clockwise to them), and non-horizontal object edges may instead be depicted by the counter-clockwise-facing edges of sections 1211 and 1215.

The curvilinear sub-sections discussed above are exemplary, and preferred, but any number of differing curved edges and angles between sub-pixel boundaries may instead be used, and with any shape pixel, and such sub-sections need not traverse the center of the pixel or have a slope varied by a function to carry out aspects of the present invention. In fact, straight-edged sub-sections with varying angles and crossing at various distances from the center and neighboring pixels or pixel divisions may be preferred for some types of images and for manufacturing cost.

Although a uniform type of pixel, subdivided into sections with edges of different selectable contours, is shown, a non-uniform pixel array may also be used in which some pixels contain some, but not all, curvilinear edge options, and such options exist in varied angles from that shown, the same or substantially the same angles of which occur at set distance intervals that may complete flowing lines of one another with little, if any, perceivable interruption. Preferably, if a pixel array with differently-curved sections in some pixels, compared to other pixels, is used, consistent curved sections appear in alternating pixels in arrangements approximately following the curve of a common object edge. In this way, a wide variety of different curves may be more accurately rendered by the array, while maintaining more surface area for light emission.

Fewer and/or more separated curvilinear sections and/or sub-sections may be used if the pixel is also rotationally actuable to better approximate the angles of edges of objects to be depicted by the media. For example, a magnetically rotatable and/or pitchable or spherically rotatable pixel element may support a wide variety of differing curves, preferably with curved edges that vary their slope, or the appearance of their slope, by the pitch and rotation of the pixel.

Figure 13:
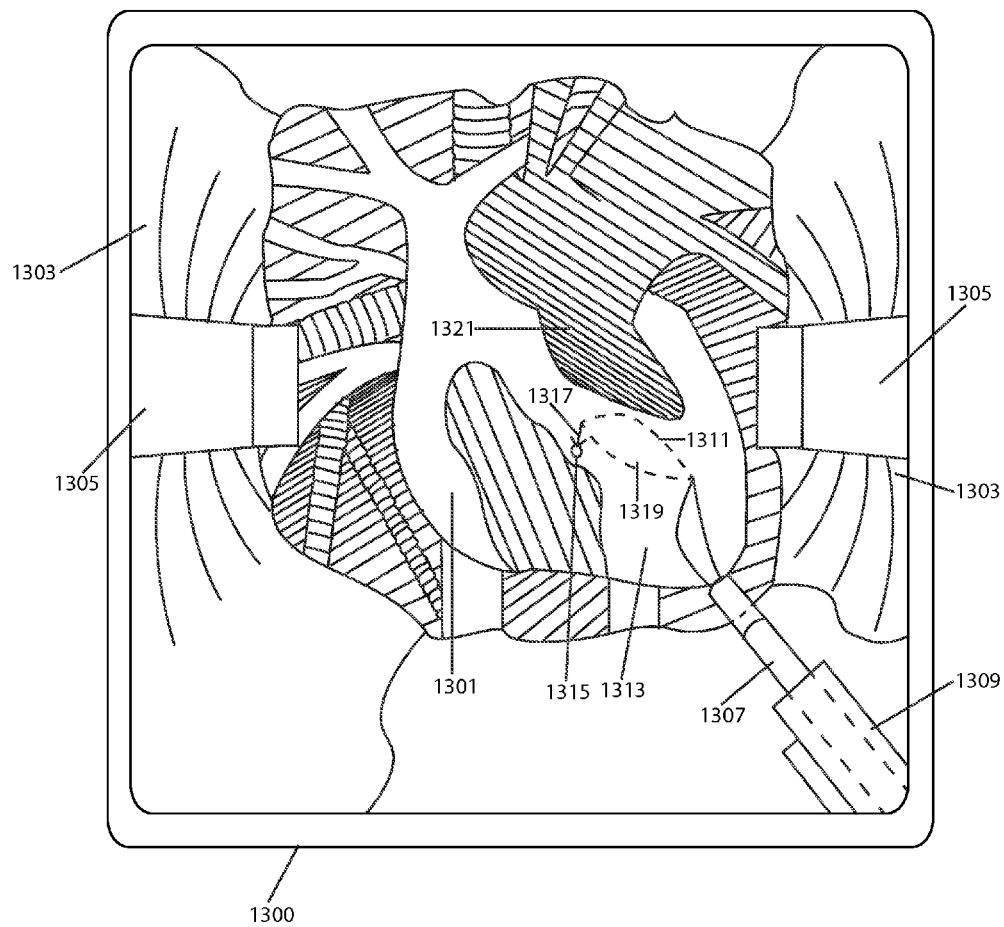
FIG. 13 is an illustration of a computer display, displaying a top-view of a robotically-actuated surgical procedure, using a system, such as a system comprising computer hardware and/or software, in accordance with aspects of the present invention, including a specialized cursor of a GUI for planning actuation path control.

FIG. 13 is an illustration of a computer display 1300, displaying a top-view of a robotically-actuated open-heart surgery procedure, using a system, such as a system comprising computer hardware and/or software, in accordance with aspects of the present invention, including aspects of a customized cursor for planning actuation path control. A human heart 1301 appears at the center of the display, and is the subject of the surgical procedure, which is underway. Dressings and/or tissue 1303 are held open and apart by retractors 1305, to create access to the heart for a robotically actuated scalpel 1307, which is controlled by the remainder of the computer hardware and/or software system, which may comprise a system such as that discussed with reference to FIG. 9. For example, such a system may send actuation command signals to servo/motors (not pictured) connected to, and able to articulate in accordance with such commands, a support articulation-executing armature(s) 1309 connected to and supporting scalpel 1307. Preferably, those servo/motors and armature(s) 1309 are able to provide movement of the scalpel along paths in any and all of three dimensions individually and/or simultaneously in a wide variety of unlimited degrees or amounts and with any rotational articulation of the blade permitted by the remainder of the surgical environment and subject. Also preferably, the servo/motors and armature(s) 1309 are able to apply a wide variety of movement vectors, complexes thereof, and varying pressures along such paths against objects or tissues encountered by the scalpel (or other surgical tool so actuated), and also are able to provide a wide variety of complex integrals of movement and sub-path movements (e.g., sawing or vibration movements) and pressure patterns over both time periods and tool paths, in accordance with commands or actuation signals from some part of the remainder of the system. Such movement vectors, complexes thereof, varying pressures along such paths and sub-paths and complex integrals of movement and pressure patterns may be planned in advance, made more smooth, rapid, slow or safe, shortened, lengthened, amended, separated and/or actuated in parts or by graduated execution enabling hand or other controls, which may be simplified, smoothed, cushioned, buffered and otherwise executed, manipulated and altered by the user and/or the system—as will be explained in more detail, below.

Figure 14:
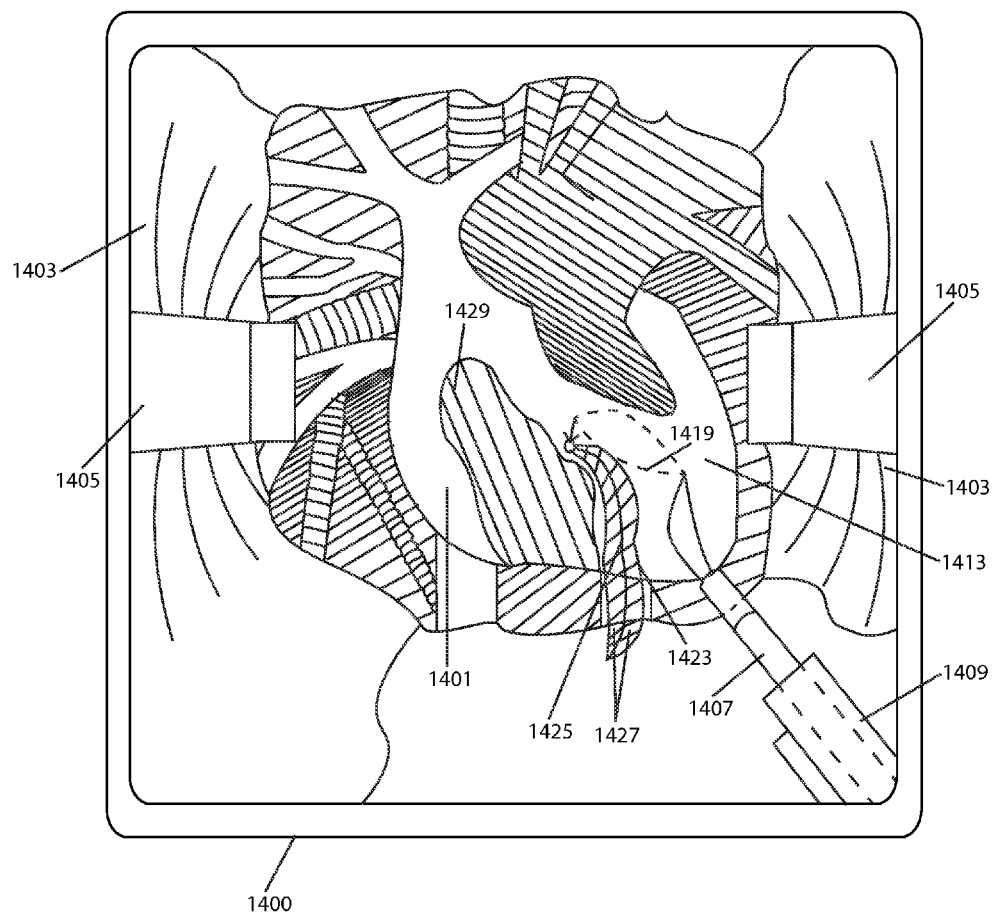
FIG. 14 is an illustration of the same computer display as depicted in FIG. 13, displaying the same top-view of a robotically-actuated surgical procedure, using the same system but in accordance with additional aspects of the present invention, including additional aspects of a customized cursor for planning actuation path control.

Such movement vectors, complexes thereof, varying pressures along such paths and sub-paths and complex integrals of movement and pressure patterns may be planned with the aid of a customized cursor for planning actuation path and sub-paths control, some possible aspects of which are illustrated in part in FIGS. 13 and 14. For example, dashed line 1311 is a part of a customized cursor for planning actuation path control, and illustrates an initial "placement path" segment input by a user, such as a surgeon seeking to plan an incision into the heart 1301. More specifically, the user is planning a path to cut into the pericardium 1313, and expose part of other structures of the heart, but does not wish to apply cutting pressure to the pericardium 1313 until reaching the point at the center of circular cursor aspect 1315, which indicates desired contact and initial applied pressure to the subject of the surgery, the pericardium 1313. Another aspect of the customized cursor for planning actuation path control is an arrow-shaped scalpel angle indicator cursor aspect 1317, which section is shaped like an arrow to indicate the planned angle and direction of the blade upon the beginning application of pressure at the center of cursor aspect 1315. Alternate placement path line segment 1319 demonstrates an aspect of the present invention that may be used for a safety and system-suggestion to aid a user of the system. The system may detect, by physical and anatomical models and projections, as discussed in greater detail below, that some structures closer than others to a planned path, whether or not that planned path involves cutting or other actuation pressure, present greater hazards than others that may be ameliorated by creating additional distance from the planned path. In the instance of path 1311, input by the user, for example, the system may detect that the path draws unnecessarily close, within several millimeters, of pulmonary veins 1321, to arrive at the initial applied pressure position indicated by cursor aspect 1315 creating too great an unnecessary danger to be tolerated, based on settings by the user and/or system. The system may also determine that, based on the initial scalpel position, shown as 1307, and the planned initial applied pressure position, at the center of 1315, a safer initial placement path may be used, such as path 1319, and the system may suggest such a path 1319, as an alternative, to the user and/or automatically implement it when a placement path is requested to be executed by the user. The safest equivalent path suggested by the system as 1319 may incorporate any number of safety factors, including possible or anticipated surgical subject movement(s) (such as from breathing or heartbeat), other nearby important structures, and may rank and/or assign a relative value to those risks, to arrive at an optimized path in terms of safety. In response to a suggested safer path, such as 1319, the user may accept, moderate or otherwise modify any suggested path and initially plotted path by the user, and each possible path may be separately identified and contrasted for the user by the system. While these safety suggestions may also be applied to any planned actuation path (discussed in greater detail below), including those with and without pressure or other actuated action or radiation applied to a subject, the optimization factors are preferably more attenuated by whether the user selects structures as actuation structures, or structures needing protection, and with safety margins that may be variably set by the user. In addition to suggested path modifications for safety, the system may incorporate any desired factor, including actuation-optimizing factors, to arrive at optimal suggested paths.

The system may also use physical and graphical models and projections, including but not limited to those built by live feedback and anatomical and biological models and projections, to demonstrate a user's planned interaction with the displayed and actuable environment. For example, based on pressure resistance models for human tissue, the system may project the amount of tool actuation resistance, and required tool pressure and/or movement, along a path and may automatically compensate for and modify the plan to include such pressure and/or movement, while providing feedback about that pressure (which may include warnings for pressure differentials between the planned paths and encountered resistance that indicate an unanticipated or unsafe object in the path) to the user. Such physical and graphical models and projections may be augmented by user input, sensory scanning and tissue or other environmental compositional and shape analysis, which may be derived from any form of camera or scanning technology (and multiple instances, positions or other movements thereof to provide imaging information and/or augmenting physical model and/or 3-D information), including, but not limited to, MRI, X-Ray, sonar, photographic, PET and infrared imaging techniques.

FIG. 14 is an illustration of the same computer display, now shown as 1400, displaying a top-view the same robotically-actuated surgical procedure, using a system, such as system comprising a computer hardware and/or software, in accordance with additional aspects of the present invention, including additional aspects of a customized cursor for planning of actuation path control. In FIG. 14, the user has selected the suggested safer initial placement path 1319 from FIG. 13, now shown as 1419, for potential execution by the system. In addition, the user has plotted a potential actuation path section 1423 for execution, which may incise the pericardium, now 1413, discussed with reference to FIG. 13. Such actuation and placement paths may be drawn with the aid of a separate drawing cursor to plan such paths on the display prior to execution, which execution may be separately directed by the user, and may be directed at selectable speeds, path progress dictating controls, throttles, and other aspects set forth in the present application.

In addition to conventional displayed path drawing tools, an actuation emulation or simulation tool or interface, such as that incorporating force-feedback and/or utilizing a virtual space, may be used by the user and system to plan placement and actuation paths, which are then presented and/or simulated for the user prior to execution as selectable, modifiable potential actuation execution paths. As with placement paths, actuation execution paths may be system-enhanced, for example, with modification suggestions by the system for the user, such as smoothing to remove hand tremor, for example, by shock absorption in the emulation/simulation interface, or by smoothing functions in the projected path. In addition, paths may be created by drafting tools, such as the "pen tool" of graphic design (e.g., as featured in Adobe Photoshop), which allow the creation of steady curves of movement, augmented by pressure and speed smoothing and curving filters applied to the drawn paths.

With reference to planned actuation path 1423, a number of additional path and path manipulation aspects may be discussed. Path 1423 has both a central line 1425 and a varying width of separately shaded area 1427, to the left and right at right angles from the central line 1425. The central line may indicate the location and direction of the scalpel incision along the path, as it will be executed when chosen to be executed by the user. The amount of width on each side perpendicular to the central line of the path may indicate the amount of force applied to and/or potentially affected tissues peripheral to the central line of the path, as it varies—with greater widths corresponding to greater pressure and impacted peripheral material, and vice versa. The user may modify such pressure using further aspects of the GUI, including, but not limited to, actuating GUI tools for increasing and decreasing the widths of 1427, optionally, at points or along lengths of central line 1425, which may be further selected by path segmenting tools, such as anchor creation or movement tools. In addition, the path may be adjusted (in direction, speed, pressure or any other execution aspect) by the user and/or automatically (potentially, as a suggestion electable by the user) to avoid structures, such as thymus gland 1429, and the system may then smooth and modify the path to avoid such structures, optionally, with a safety margin that may be variably set by the user. Other effects, such as sub-path movements or other path augmentations (e.g., sawing motions, vibrations, ultra-sound, electrical charge, substance emission, cauterization, etc.) may also be indicated and subject to editing by a user or the system, as aspects of the path. For example, a red shading of shaded area 1427 may indicate cutting sub-path movement while a blue shading or, as another example, lightning bolt texture might indicate cauterizing during the path. It should be noted that, preferably, shaded area 1427 is at least semi-transparent, allowing a user to view any underlying structures.

Figure 15:
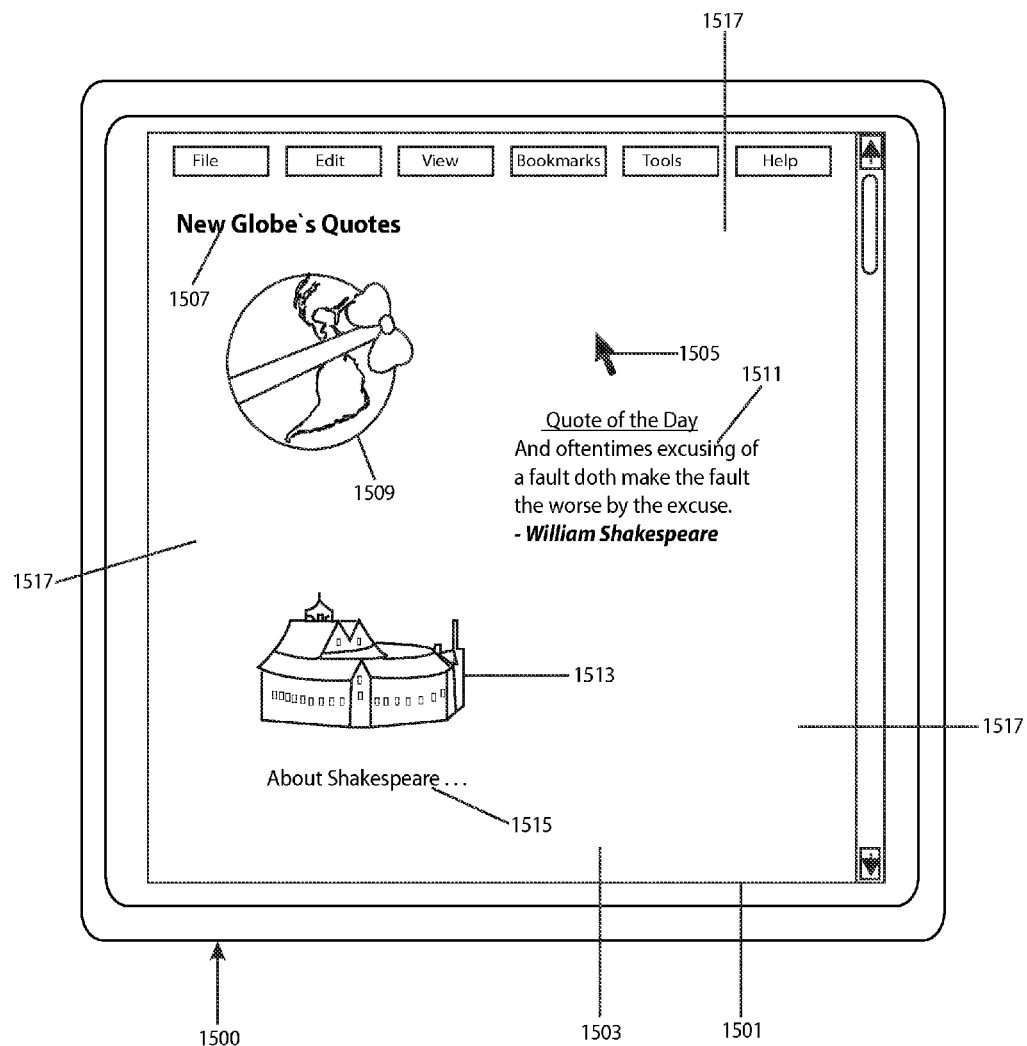
FIG. 15 is an exemplary depiction of the display of a system, such as a system comprising computer hardware and/or software, displaying a user interface, including a browser window showing a web page, and a cursor, which will serve as a platform for discussing further aspects of the present invention related to dynamic cursor/media interaction.

FIG. 15 is an exemplary depiction of a display 1500 of a system, such as a system comprising computer hardware, and/or software, displaying a user interface, including a browser window 1501 showing a web page 1503, and a cursor 1505, which will serve as a platform for discussing further aspects of the present invention. The displayed web page 1503 comprises actuable and other elements 1507-1515 as well as blank background space, such as that shown as 1517. The displayed cursor 1505 is shown in the figure as hovering over and occupying an expanse of that blank background space 1517 and, as a result, no actuable or readable content (e.g., text) is covered or obscured from the view of a user of the display. However, ordinarily, if a cursor such as 1505 were to be moved over an actuable and/or readable element, such as the quote text 1511, the cursor would partially obscure and potentially render illegible part of that element for a user. In addition, there may be reasons why a user may accidentally or intentionally need to so move the cursor. For example, the user may desire to highlight and copy the quoted text. Such a cursor may change forms to indicate actuability, for example, converting to a vertical line with top and bottom bars to indicate that text may be highlighted, or converting to a hand to indicate that an element may be clicked to actuate it but such cursors will continue to obscure part of the element over which they hover. Generally, these different forms of pointer or other cursor occupy similar space, centered on the same point of the user interface on the display.

Figure 16:
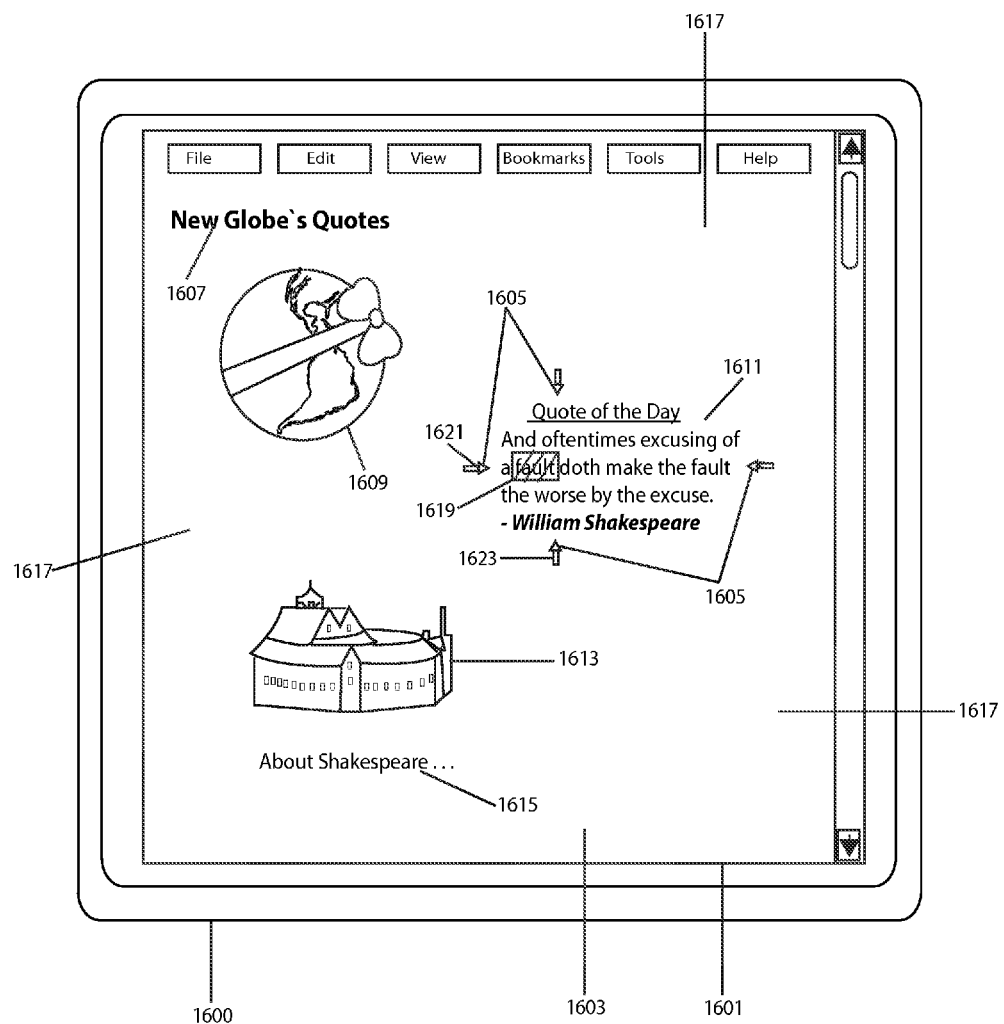
FIG. 16 is an exemplary depiction of the same display as that depicted in FIG. 15, illustrating further cursor dynamics aspects of the present invention.

FIG. 16 is an exemplary depiction of the same display, now shown as 1600, as that depicted in FIG. 15, illustrating some further cursor dynamics aspects of the present invention. After a user moved cursor 1505 (now shown as new cursor aspects 1605) downward from open browser space 1517 (now 1617), cursor 1605 has changed form to avoid blocking and interfering with the legibility of text element 1611, while still indicating the central cursor location. More specifically, the system has caused the arrow shape of cursor 1505 to disappear, while creating at least one pointing sub-element, such as 1621 and 1623, which new cursor 1605 comprises. Preferably, the elements new cursor 1605 comprises replace the form of old cursor 1505 if and when any part of cursor 1505 would otherwise, if not for changing form to 1605, occupy space over an element and would therefore block or obscure or render less legible at least part of that element. The pointing sub-elements, such as 1621 and 1623, comprised by the new form of cursor 1605 indicate the central point of the cursor without interfering with the presentation of element or object 1611, which the system or user identify as an object to preserve presentation of, and so indicate the central position by the point of intersection of lines of direction (not pictured) indicated by their pointing directions. Preferably, such sub-elements are created pointing in horizontal or vertical directions, but need not be. Because two or more sub-elements could be sufficient to produce such intersecting directions at a point in a 2-D display, a specialized cursor 1605 may contain 2 or more such sub-elements, but preferably, contains 3 sub-elements located near element edges in 3 directions from the central cursor location where the central cursor location is substantially closer to those 3 element outer edges in those directions, to aid in focusing a user's attention in the correct proximity of the central cursor location, and 4 sub-elements when the central location is substantially equidistant from all edges, which substantiality (percentage or amount of distance) may be variably set by the user or system. Alternatively, at least one cursor sub-element may indicate that it (they) is/are closest to the central location of the cursor, in comparison to other sub-elements, by a visual indication (such as taking on a bolder, larger, differently colored, moving or activated and/or highlighted form). If 2 sub-elements are used, preferably, they occupy a space near or abutting the horizontal space at the edge of the element nearest the central cursor location, and a third or fourth sub-element may appear when the central cursor location is substantially equidistant from 2 opposing edges in the same direction. A wide variety of central-position-indicating cursor-sub-element shapes, sizes, numbers and angles, and complexes or unifications thereof (e.g., surrounding ring, box or other outline or border shape or highlighting with hashes at circumference points surrounding an element indicating line intersections corresponding with the central cursor location) may be alternatively used while maintaining some aspects of the present invention. Such sub-elements may be used in 2-D, 3-D or otherwise multiple-dimensional display space, in which case they may themselves occupy multiple dimensional space with a multi-dimensional shape, and they may exist in greater number and indicate and occupy additional axes. Axes for placing cursor sub-elements may differ or be in addition to major axes X, Y and Z, which may aid in avoiding interference with typical vertical and horizontal structures, but this may not be preferred in all applications. The new cursor form 1605 may complete similar operations as other, conventional cursor forms. For example, when hovering above or near text, a user may "click and drag" to highlight text, which such an actuation gesture is shown as completed in FIG. 16 (at the point of clicking, the central cursor location was to the left, at the beginning of the word "fault," and then dragged to the position now indicated by the cursor sub-elements, at the end of the word "fault.") To further aid in user's visual acquisition of the central cursor location, a change in color or other aspect, attribute or effect of a sub-part of the actuable element may in addition, or instead, be shown. For example, at its present central location, cursor 1605 may be indicated by the letter "t" in "fault" being highlighted, differently colored, bolder or embossed (to give a few examples of such effects), than text surrounding it, for just such time as it is encompassing or nearest the central location of cursor 1605.

Upon exiting the area occupied by actuable text element 1611, or upon the system determining that such a change in form will no longer substantially aid in preventing the interference with the legibility or visibility of the element, the cursor form may again return to the pointer shaped shown in FIG. 15, as 1505.

I claim:

1. A system comprising:
  a processor, a display, and a memory containing instructions that, when executed, cause the processor to:
  address an impact of a display movement, the display movement including a Population Movement, a Position Movement, a Rotation Movement, or a Zoom Movement caused by a plurality of dynamic elements or content that is loading or projected to be loaded within a first display space of a GUI, wherein the first display space comprises an at least one page, an at least one user interface actuation tool, and an at least one actuable element;
  determine that a behavior would be impacted by the display movement, wherein the behavior comprises a behavior of the at least one user interface actuation tool or a behavior of the at least one actuable element as it interacts with the at least one user interface actuation tool; and
  alter the behavior that would be impacted including creating an alternate or a virtual display aspect in addition to the first display space, wherein the created alternate or the virtual display aspect defines a location, a movement, or an actuation of the at least one user interface actuation tool relative to a location of the at least one actuable element as it existed prior to the display movement, wherein during alteration of the behavior permits a user to interact with the at least one page through the at least one user interface actuation tool or the at least one actuable element.

2. The system of claim 1, further comprising:
  carrying out alteration of the behavior until a pre-determined reaction time has been exceeded.

3. The system of claim 1, wherein alteration of the behavior further including repositioning the at least one user interface actuation tool in the first display space to follow a movement of the at least one actuable element due to the display movement.

4. The system of claim 1, wherein alteration of the behavior further includes determining an at least one unactuated actuable element within the first display space, wherein the at least one unactuated actuable element would have been actuated had the display movement not occurred; and
  actuating the at least one unactuated actuable element.

5. The system of claim 1, wherein alteration of the behavior further includes presenting the user with a user interface comprising a plurality of actuation options corresponding with a position of the at least one user interface actuation tool before, during, or after the display movement; and
  allowing the user to select at least one of the plurality of actuation options.

6. The system of claim 1, wherein alteration of the behavior further includes implementing a hot area;
  determining that the at least one user interface actuation tool is within the hot area for less than a predetermined amount of time or that a pre-determined amount of system progress has not occurred, wherein the pre-determined amount of system progress comprises receiving a user input redirecting the at least one user interface actuation tool after the display movement or a separate indicator of system progress; and
  take a further action.

7. The system of claim 1, wherein alteration of the behavior further includes implementing a time setting for a period following the display movement during which the system will address the impact of the display movement.

8. The system of claim 5, further comprising:
display a preview of a result of the user selecting at least one of the plurality of actuation options.

9. The system of claim 8, further comprising:
displaying a link to return the user to a display condition of the first display space following the display movement.

10. A system comprising:
a processor, a display, and a memory containing instructions that, when executed, cause the processor to:
address an impact of a display movement due to a content loading within a first display space of a GUI, wherein the first display space comprises a page, an at least one user interface actuation tool, and an at least one actuable element, wherein address of the impact of the display movement occurs before the page is fully rendered in the first display space;
determine that a behavior would be impacted by the display movement, wherein the behavior comprises a behavior of the at least one user interface actuation tool or a behavior of the at least one actuable element as it interacts with the at least one user interface actuation tool; and
alter the behavior that would be impacted including creating an alternate or a virtual display aspect in addition to the first display space, wherein the created alternate or the virtual display aspect defines a location, a movement, or an actuation of the at least one user interface actuation tool relative to a location of the at least one actuable element as it existed prior to the display movement, wherein during alteration of the behavior, permits a user to interact with the at least one page through the at least one user interface actuation tool.

11. The system of claim 10, wherein alteration of the behavior further includes determining a size and a position of an at least one content element to be loaded in the first display place; and
implementing an at least one placeholder with a size and a position matching the size and the position of the at least one content element to be loaded.

* * * * *